(12) United States Patent
Garg

(10) Patent No.: US 7,081,897 B2
(45) Date of Patent: Jul. 25, 2006

(54) UNIFIED MEMORY ORGANIZATION FOR POWER SAVINGS

(75) Inventor: Pankaj Kumar Garg, Sugunami-Ku (JP)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 10/745,824

(22) Filed: Dec. 24, 2003

(65) Prior Publication Data

US 2005/0140685 A1    Jun. 30, 2005

(51) Int. Cl.
  *G06F 12/02* (2006.01)
  *G11C 5/14* (2006.01)
(52) U.S. Cl. .................... 345/543; 365/226; 365/227
(58) Field of Classification Search ............... 345/543, 345/542, 531, 530, 536, 541; 713/300, 320, 713/340; 365/226, 227; 711/100
  See application file for complete search history.

(56) References Cited

U.S. PATENT DOCUMENTS

| | | | | |
|---|---|---|---|---|
| 5,560,022 A | * | 9/1996 | Dunstan et al. ............. | 713/300 |
| 5,740,454 A | * | 4/1998 | Kelly et al. .................. | 713/320 |
| 5,793,385 A | * | 8/1998 | Nale .......................... | 345/542 |
| 5,835,435 A | * | 11/1998 | Bogin et al. ................ | 365/227 |
| 5,928,365 A | | 7/1999 | Yoshida et al. | |
| 6,192,446 B1 | * | 2/2001 | Mullarkey et al. .......... | 711/105 |
| 6,434,688 B1 | * | 8/2002 | Rhoden et al. ............... | 712/34 |
| 6,864,896 B1 | * | 3/2005 | Perego ....................... | 345/542 |
| 2002/0118204 A1 | | 8/2002 | Aleksic et al. | |
| 2003/0023825 A1 | | 1/2003 | Woo et al. | |
| 2004/0080512 A1 | * | 4/2004 | McCormack et al. ....... | 345/543 |
| 2004/0111596 A1 | * | 6/2004 | Rawson, III ................... | 713/1 |

OTHER PUBLICATIONS

Kozierok, Charles M.; "The Memory Controller"; Apr. 17, 2001; http://www.pcguide.com/ref/ram/timingController-c.html.*
Holte, Robert; "Dynamic Memory Allocation"; http://www.csi.uottawa.ca/~holte/T26/dyn-mem-alloc.html.*
"Desktop PCs Buying Guide"; May 2003; http://pcworld.idg.com.au/pp.php?id=1541570664&p=4&taxid=112.*
"Desktop PCs Buying Guide"; May 2003; http://pcworld.idg.com.au/pp.php?id=1541570664&p=4&taxid=112; p. 5 of 13.*
Delaluz V et al: "Hardware and Software Techniques for Contrilling DRAM Power Modes", IEEE Transactions on Computers, IEEE Inc., New York, UZ, vol. 50, No. 11, Nov. 2001, pp. 1154-1173.

(Continued)

*Primary Examiner*—Ulka Chauhan
*Assistant Examiner*—Joni Hsu
(74) *Attorney, Agent, or Firm*—Blakely, Sokoloff, Taylor & Zafman LLP

(57) ABSTRACT

Positioning a block of graphics memory within a memory system so as to minimize the number of memory devices and/or banks of memory within memory devices occupied by the block of graphics memory so as to maximize the number of memory devices and/or banks of memory within memory devices that are not occupied by even a portion of the block of graphics memory, and thereby, maximize the number of memory devices and/or banks of memory within memory devices that may be placed into a lower power state without causing the block of graphics memory to become inaccessible so as to impair reading out graphics data to support refreshing an image on a display device.

16 Claims, 13 Drawing Sheets

OTHER PUBLICATIONS

Alvin R. Lebeck, Xiaobo Fan, Heng Zeng and Carla Ellis: "Power Aware Page Allocation", ACM SIGOPS Operating Systems Review / ASPLOS-IX. Ninth International Conference on Architectural Support for Programming Langualges and Operating Systems Nov. 12-15, 2000 Cambridge, MA, USA, vol. 34, No. 5, Dec. 2000, pp. 105-116.

PCT Search Report and Written Opinion, 21 pp. PCT/US2004/043668, mailed Oct. 13, 2005.

* cited by examiner

UNIFIED MEMORY ORGANIZATION FOR POWER SAVINGS

BACKGROUND

Electronic systems such as computer systems continue to be designed to meet two goals that are occasionally at odds, those goals being decreased cost and decreased power consumption. These goals are driven by the continuing trends of ever increasing varieties of uses being found for such devices, including increasing uses requiring ever greater portability, and the ever present desire to make such devices more accessible to more end users through decreases in costs. Requirements for increased portability have placed demands on such electronic systems to be smaller, lighter and capable of operating for increasingly longer periods of time off of portable power sources such as batteries. Requirements for decreased costs have placed demands on such electronic systems to be made from smaller numbers of more highly integrated components to reduce parts stocking and assembly costs.

Reducing the physical size of the memory system in such electronic systems by finding ways to reduce the quantity of memory devices making up the memory system would seem, at first, to be a way of achieving both goals. Reducing the number of memory devices can be a way to reduce overall power consumption by the memory system, and can result in a memory system that is physically smaller. One way to achieve such a reduction in the number of memory devices is the employment of a unified memory architecture (UMA) in which both a graphics controller and a processor of an electronic system share the same memory devices such that the same memory system serves as both graphics and system memory. Depending on the graphics and processing capabilities, as well as the memory requirements of a given electronic system, implementing UMA could literally cut the total number of memory devices in a given electronic system in half, resulting in considerable power, weight and space reductions.

In the vast majority of current day electronic systems, both system and graphics memory tend to be made up of dynamic random access memory (DRAM) devices which, as those skilled in the art will readily recognize, require refresh operations to be carried out on every memory cell being used to store data at regular intervals in order to preserve that data. During normal operation of a memory system employing DRAM memory devices, refresh operations are interleaved at regular intervals with normal read/write operations. In trying to conserve power, many current day DRAM memory devices provide a lower power mode referred to as "self-refresh" mode in which the buses and interfaces to the DRAM memory devices are powered down, and the DRAM memory devices consume only enough power to carry out refresh operations, internally, and retain data. With the buses and interfaces to the DRAM memory devices powered down, normal read/write operations cannot be carried out. In other words, in self-refresh mode, data is retained, but cannot be accessed.

Many current day electronic systems implement a form of lower power mode in which DRAM memory devices serving as system memory devices are placed in self-refresh mode, while DRAM memory devices serving as graphics memory devices continue to be operated normally to accommodate the need to support refreshing an image provided on a display device driven by a graphics controller. As those familiar with graphics systems will readily recognize, the majority of types of display devices used in current day electronic systems require retransmission of image data to a display device at regular intervals to refresh the display to maintain an image on the display. This regular retransmission of an image requires the image data to be read out of graphics memory at regular intervals, and therefore, if it is desired to maintain an image on the display of an electronic system, the buses and interfaces to graphics memory cannot be powered down.

In current day electronic systems in which entirely separate buses, interfaces and memory devices are used to serve as system and graphics memory, it is easily possible to power down system memory while leaving graphics memory undisturbed. However, where UMA is implemented, causing the same memory devices of a unified memory system to serve both system and graphics memory functions, problems arise in attempting to power down system memory while leaving graphics memory undisturbed.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern incorporating support for limiting the number of memory devices and/or limiting the size of the portion of one or more memory devices serving as graphics memory devices in an electronic system employing UMA. More specifically, the present invention concerns limiting the number of memory devices and/or limiting the size of the portion of one or more memory devices that cannot be placed into a lower power state, at least to the extent possible for memory devices and/or portions of memory devices serving as system memory devices in such an electronic system. Although the following discussion centers on DRAM devices, it will be understood by those skilled in the art that the present invention as hereinafter claimed may be practiced in support of any type of memory device providing some form of lower power state. It will also be understood by those skilled in the art that although the following discussion centers on memory devices in which memory cells are organized in two dimensional arrays of rows and columns within banks, the memory cells may be organized in any of a number of ways, including arrays of more than two dimensions, with various forms of interleaving, content-addressable, etc. Also, although at least part of the following discussion centers on memory within computer systems, it will be understood by those skilled in the art that the present invention as hereinafter claimed may be practiced in connection with other electronic systems.

Figure 1:
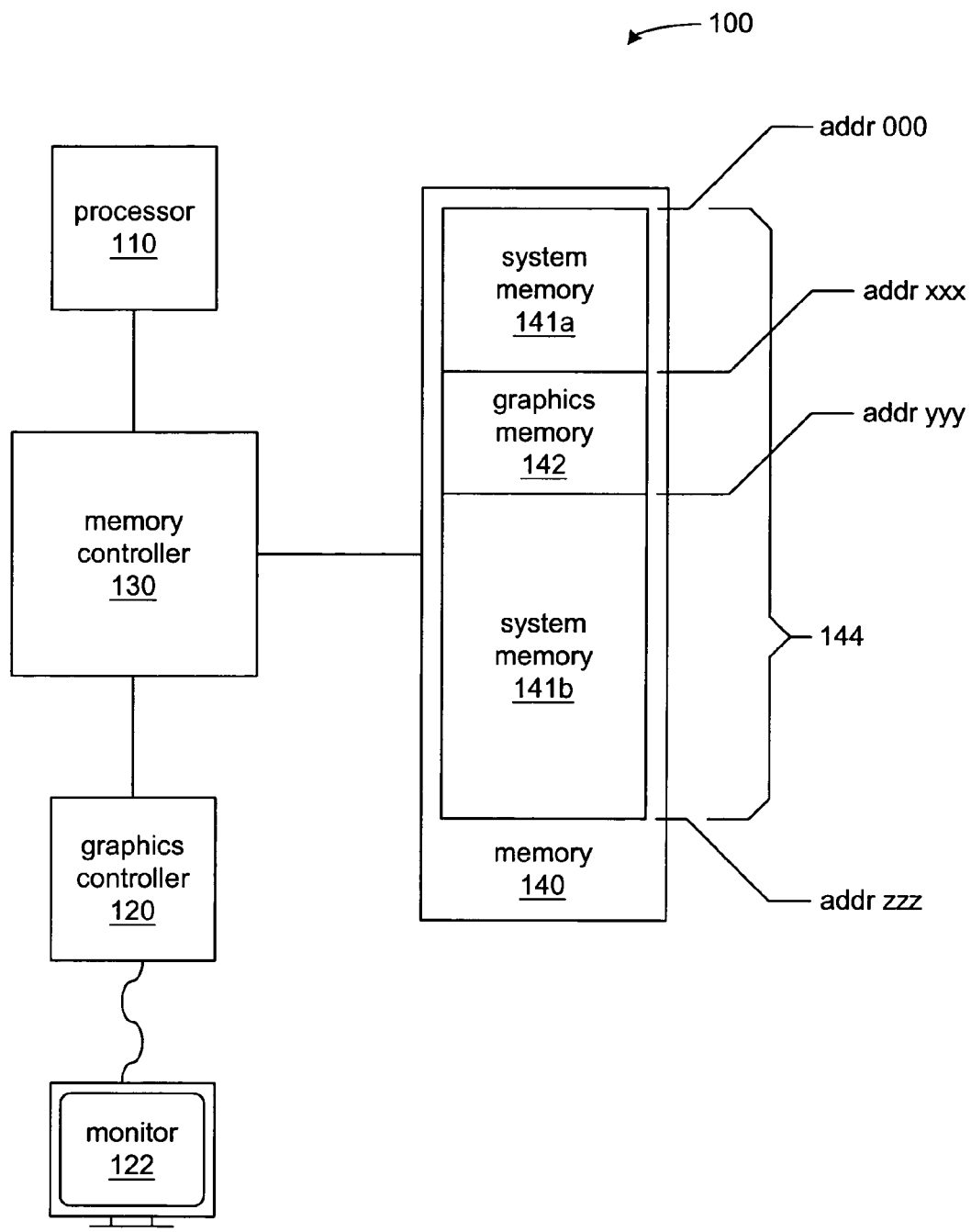
FIG. 1 is a block diagram of an embodiment employing a computer system and detailing a memory map.

FIG. 1 is a block diagram of one embodiment employing a computer system. Computer system 100 is, at least in part, made up of processor 110, graphics controller 120, memory controller 130 and memory 140. Memory controller 130 is coupled to both processor 110 and graphics controller 120, and provides both processor 110 and graphics controller 120 with access to memory 140 to which memory controller 130 is also coupled. Graphics controller 120 is further coupled to monitor 122, and provides image data retrieved from memory 140 to monitor 122 to be displayed by monitor 122. Processor 110, memory controller 130 and memory 140 make up a form of core for computer system 100 capable of supporting the execution of machine readable instructions by processor 110 and the storage of data, including instructions, within memory 140. In various embodiments, processor 110 could be any of a variety of types of processor including a processor capable of executing at least a portion of the widely known and used "x86" instruction set, and in other various embodiments, there could be more than one processor.

In various embodiments, memory 140 could be made up of one or more memory devices of any of a variety of types of DRAM including fast page mode (FPM), extended data out (EDO), single data rate (SDR) or double data rate (DDR) forms of synchronous dynamic RAM (SDRAM), RAM of various technologies employing a RAMBUS™ interface, etc. Memory controller 130 provides an appropriate interface for memory 140, regardless of DRAM type. In some embodiments, memory 140 may be a removable module, such as a single inline memory module (SIMM), dual inline memory module (DIMM), single inline pin package (SIPP), etc., implemented in the form of a substrate, such as a small circuitboard, on which are mounted one or more memory ICs (integrate circuits). In other embodiments, memory 140 may be made up of one or more memory ICs mounted directly to the same larger circuitboard on which one or more of processor 110, graphics controller 120 and/or memory controller 130 are also mounted.

Memory map 144, with starting and ending addresses 000 to zzz, depicts one possible example of an allocation of memory space within memory 140 in various possible embodiments. As depicted, the portion of the memory space within memory 140 allocated as system memory is split into system memory 141a (from address 000 to address xxx) and system memory 141b (from address yyy to address zzz), surrounding graphics memory 142 which is the portion of the memory space within memory 140 allocated as graphics memory (from address xxx to address yyy). In various possible embodiments, the allocation of portions of memory 140 as system and/or graphics memory may be carried out by a processor (perhaps processor 110) executing code such as firmware within a nonvolatile memory device on a circuitboard to which the processor has access, or such as an operating system loaded from some form of media, such as the platter(s) of a hard disk. Regardless of the mechanism by which space within memory 140 is allocated, all the space for graphic memory is allocated as a single contiguous block, i.e., graphics memory 142, and mapped within memory map 144 so as to have only a single pair of starting and ending addresses within memory map 144 (i.e., address xxx and address yyy) to attempt to cause graphics memory 142 to occupy as few memory ICs and/or as few banks within one or more memory ICs as possible. As those skilled in the art will readily recognize, an allocation of graphics memory 142 to occupy as few memory ICs and/or banks within one or more memory ICs does not necessitate graphics memory 142 being allocated between portions of system memory as depicted, and graphics memory 142 may be allocated at either end of memory map 144 (i.e., graphics memory 142 may be allocated starting at address 000 or ending at address zzz.

In embodiments in which memory 140 is implemented with only a single memory IC having multiple banks in which memory cells are organized in two-dimensional arrays, graphics memory 142 is allocated to occupy as few banks of memory cells as possible. On occasions in which computer system 100 enters a lower power state, banks within the single memory IC making up memory 140 that are occupied solely by some or all of either system memory 141a or 141b are caused to enter a lower power state, such as self-refresh mode, while banks that are even partially occupied by graphics memory 142 are not placed in a lower power state so as to maintain the ability to at least carry out read operations to read portions of graphics memory 142 to refresh an image displayed on display 122.

In embodiments in which memory 140 is implemented with multiple memory ICs, graphics memory 142 may be allocated to occupy as few of the memory ICs as possible, and when computer system 100 enters a lower power state, memory ICs making up memory 140 that are occupied only by some or all of either system memory 141a or 141b are caused to enter a lower power state, while memory ICs that are even partially occupied by graphics memory 142 are not place in a lower power state. In some variations of such embodiments, it may be that those memory ICs that are even partially occupied by graphics memory 142 are able to have banks within them that are occupied only by portions of system memory 141a or 141b placed into a lower power state, while whatever banks are occupied by even a portion of graphics memory 142 are not placed into a lower power state.

In either embodiments in which memory 140 is implemented with a single memory IC or embodiments in which memory 140 is implemented with multiple memory ICs, processor 110 may execute a sequence of machine-readable instructions causing processor 110 to first interrogate or examine memory 140 to determine the exact configuration of number and type of memory devices making up memory 140, as well as the internal organization of banks of memory cells, if present, in each of those memory devices. In executing such instructions, processor 110 may be caused to analyze data gathered concerning the configuration and information concerning the amount of memory 140 needed to be allocated as graphics memory 142 to derive a version of memory map 144 that results in graphics memory 142 occupying as few memory devices and/or few banks of memory cells within one or more memory devices as possible, so that as many memory devices and/or banks of memory devices as possible will be occupied only by one or more blocks of system memory (such as system memories 141a and 141b), thereby making it possible to place those memory devices and/or banks of memory devices into a lower power state.

Alternatively, a simpler algorithm of defaulting to having graphics memory 142 always allocated in a single block starting at address 000 or ending at address zzz (i.e., always positioning graphic memory 142 such that graphics memory 142 will "hug" one end or the other of memory map 144) may be employed. Such a simpler algorithm may or may not entail interrogation or examination of memory 140 to determine the number and/or configuration of memory devices making up memory 140. Such a simpler algorithm would be based on a presumption that allocating all of graphics memory 142 in a single block at one end or the other of memory map 144 will, by default, usually cause graphics memory 142 to occupy as few memory devices and/or banks of memory cells as possible. Such a simpler algorithm may also be deemed desirable where it is known that all available memory devices making up memory 140 and/or all of the banks of memory within each of the memory devices making up memory 140 are of similar size and/or configuration such that there is no significant advantage achieved by locating graphics memory 142 within any one memory device (or parallel set of memory devices) over any other.

Figure 2B:
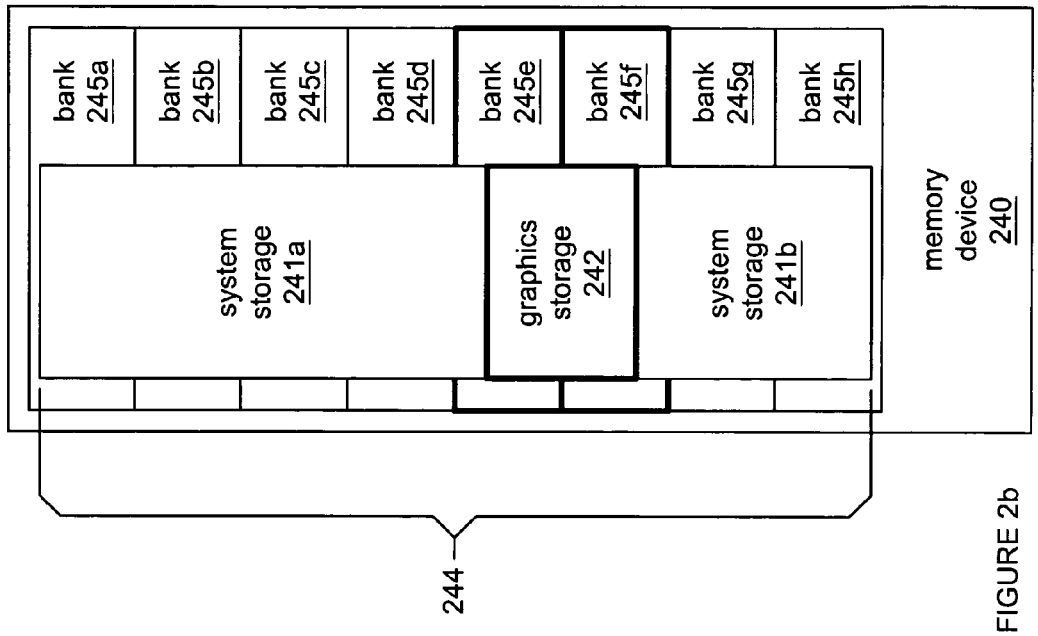
FIGS. 2a and 2b depict embodiments employing memory maps.
Figure 2A:
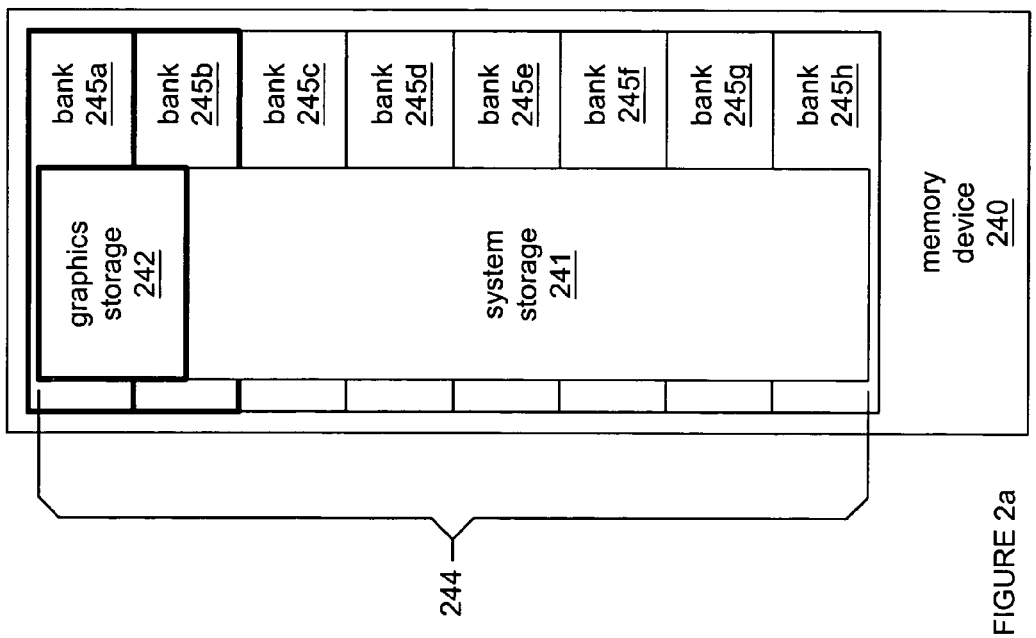

FIGS. 2a and 2b are block diagrams of embodiments employing a memory device. In both FIGS. 2a and 2b, memory device 240 is depicted as being made up of eight banks of memory cells, namely banks 245a through 245h, although those skilled in the art will readily recognize that memory device 240 may be made up of a differing number of banks of memory cells. In various embodiments, each of banks 245a–h is made up of a two-dimensional array of rows and columns of memory cells, and each bank is separately addressable.

Memory map 244 is overlaid atop the block depiction of banks 245a–h to illustrate how system memory 241 and graphics memory 242 in FIG. 2a, and system memories 241a–b and graphics memory 242 in FIG. 2b, are allocated into the storage provided by the memory cells of banks 245a–h. Specifically, in FIG. 2a, system memory 241 occupies only part of bank 245b and all of banks 245c–h, while graphics memory 242 occupies all of bank 245a and only part of bank 245b. Also specifically, in FIG. 2b, the portion of memory device 240 that has been allocated as system memory is split into system memories 241a and 241b, with system memory 241a occupying all of banks 245a–d and only part of bank 245e, system memory 241b occupying only part of bank 245f and all of banks 245g–h, while graphics memory 242 occupies only part of both banks 245e and 245f. FIGS. 2a and 2b are provided to illustrate two differing examples of specific mappings of portions of memory device 240 as system and graphics memory. However, as those skilled in the art will readily recognize, these specific mappings of allocation of storage for a combination of system and graphics memory are but examples, and many other mappings of combinations of system and graphics memory are possible. Of importance in both FIGS. 2a and 2b is that graphics memory 242 has been allocated as a single contiguous block storage and that the location to which this single contiguous block of storage has been mapped occupies as few banks as possible, which is only two banks to accommodate graphics memory 242, which as depicted, is too large to fit within just one bank so as to minimize the number of banks (or perhaps, the number of memory devices) occupied by graphics memory 242 to attempt to maximize the number of banks and/or memory devices that do not contain even a portion of graphics memory 242, thereby maximizing the number of banks and/or memory devices that may be placed in a lower power state.

In some embodiments having a memory map that resembles memory map 244 of FIG. 2a, when memory device 240 is placed into a lower power state, banks 245c–h are placed into a lower power state, such as self-refresh mode, while banks 245a–b are not placed into a lower power state. Allowing banks 245a and 245b to continue to operate normally allows the graphical data contained within banks 245a and 245b to be read out on a regularly timed basis to support the refreshing of an image presented on a display device (not shown). In this way, an electronic system of which memory device 240 is a part may be powered down to a limited extent that would allow an image to continue to be presented on a display device.

Similarly, in some embodiments having a memory map that resembles memory map 244 of FIG. 2b, when memory device 240 is placed into a lower power state, banks 245a–d and 245g–h are placed into a lower power state, while banks 245e–f are not placed into a lower power state. Allowing banks 245e and 245f to continue to operate normally allows the graphical data contained within banks 245e and 245f to be read out on a regularly timed basis to support the refreshing of an image presented on a display device (not shown).

Figure 3A:
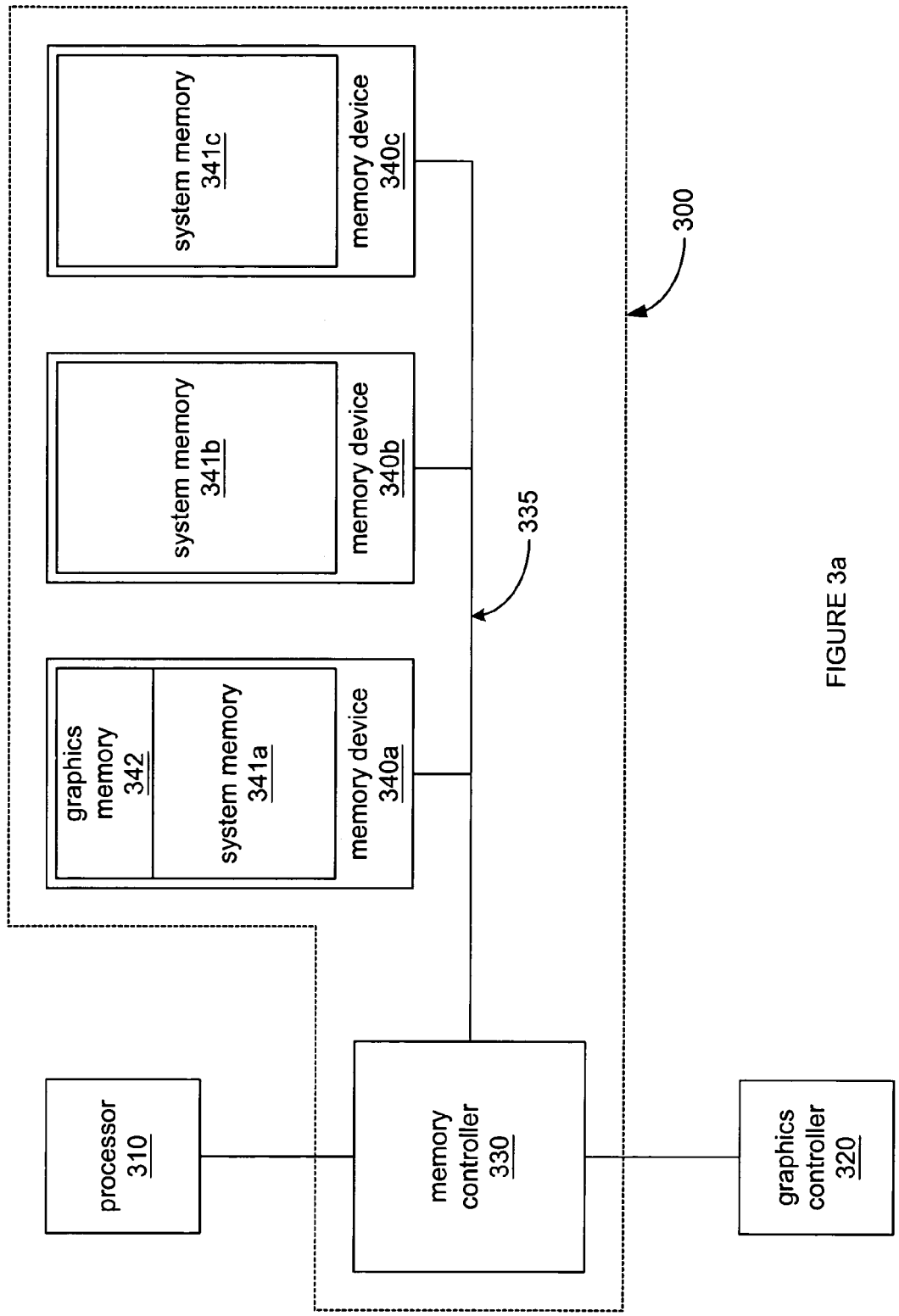
FIGS. 3a and 3b is a block diagram of embodiments employing a computer system.
Figure 3B:
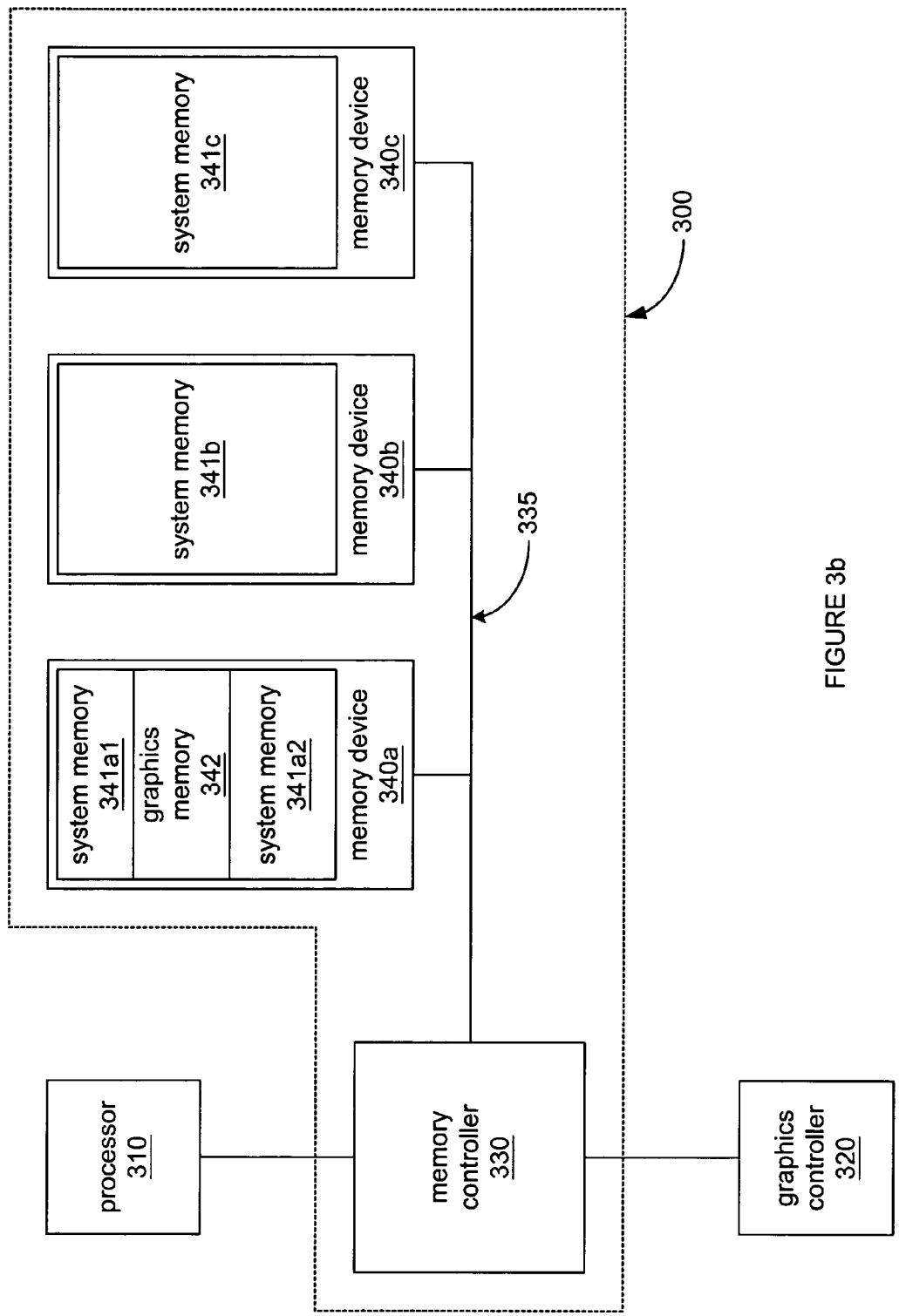

FIGS. 3a and 3b are simplified block diagrams of embodiments employing a memory system. In both FIGS. 3a and 3b, memory system 300 is made up, at least in part, of memory controller 330 and memory devices 340a–c coupled together via memory bus 335. Those skilled in the art of the design of memory systems will readily recognize that FIGS. 3a and 3b depict examples of relatively simple memory systems, and that alternate embodiments are possible in which the exact arrangement and configuration of components may be reduced, augmented or otherwise altered without departing from the spirit and scope of the present invention as hereinafter claimed. For example, although memory system 300 is depicted as having three memory devices 340a–c coupled through a single memory bus, it will be readily understood by those skilled in the art that other possible embodiments of memory system 300 may be made up of multiple buses coupling differing numbers of memory devices.

Memory controller 330 controls the functions carried out by memory devices 340a–c as part of providing access to memory devices 340a–c to at least processor 310 and graphics controller 320, both of which are coupled to memory controller 330. Specifically, processor 310 and/or graphics controller 320 issue commands to memory controller 330 to store data within one or more of memory devices 340a–c, and to retrieve stored data from one or more of memory devices 340a–c. Memory controller 330 receives these commands and relays them to memory devices 340a–c in a format having timing and protocols compatible with memory bus 335. In effect, memory controller 330 coordinates accesses made to memory cells within memory devices 340a–c in answer to read and write commands from processor 310 and/or graphics controller 320.

Memory bus 335 may be made up of various separate address, control and/or data signal lines to communicate addresses, commands and/or data, either on separate conductors or on shared conductors in different phases occurring in sequence over time in a multiplexed manner. Alternatively, or perhaps in conjunction with such separate signal lines, addresses, commands and/or data may be encoded for transfer in various ways and/or may be transferred in packets. Memory bus 335 may also communicate address, command and/or data parity signals, and/or error checking and correction (ECC) signals. As those skilled in the art will readily recognize, many forms of timing, signaling and protocols may be used in communications across memory bus 335. The exact quantity and characteristics of the various signal lines making up various possible embodiments of memory bus 335 may be configured to be interoperable with any of a number of possible memory interfaces, including widely used current day or new interfaces and/or types of memory devices, including possibly FPM (fast page mode) memory devices, EDO (extended data out), dual-port VRAM (video random access memory), window RAM, SDR (single data rate), DDR (double data rate), RAMBUS™ DRAM, etc. In embodiments where activity on various signal lines is meant to be coordinated with a clock signal (as in the case of a synchronous memory bus), one or more of the signal lines, perhaps among the control signal lines, may serve to transmit a clock signal across each of memory bus 335.

Each of memory devices 340a–c is made up of one or more memory ICs, in which there are one or more banks of memory cells organized into arrays. In some embodiments, memory devices 340a–c may each be made up of a single integrated circuit, while in other embodiments, memory devices 340a–c may each be made up of multiple integrated circuits. In various possible embodiments, each of memory devices 340a–c may be implemented in the form of a SIMM (single inline memory module), SIPP (single inline pin package), DIMM (dual inline memory module), or any of a variety of other forms as those skilled in the art will recognize. In such embodiments, as those skilled in the art will recognize, one or more of memory devices 340a–c may be made up of an assembly of multiple memory ICs that operate in parallel in a manner in which all of the memory ICs in the assembly receive the same addresses and commands, but are individually coupled to different subsets of the full width of a data bus (e.g., where a data bus is 64 bits wide with data bits number 0 through 63, one memory device is coupled to data bits 0–3, another to data bits 4–7, and so on).

In FIG. 3a, system memories 341b and 341c occupy all of memory devices 340b and 340c, respectively, while memory device 340a is allocated for both system memory 341a and graphics memory 342. In FIG. 3b, system memories 341b and 341c occupy all of memory devices 340b and 340c, respectively, while memory device 340a is allocated for system memory 341a and 341a2, as well as graphics memory 342. FIGS. 3a and 3b are provided to illustrate two differing examples of specific mappings of portions of memory devices 340a–c as system and graphics memory. However, as those skilled in the art will readily recognize, these specific mappings of allocation of storage for a combination of system and graphics memory are but examples, and many other mappings of combinations of system and graphics memory are possible. Of importance in both FIGS. 3a and 3b is that graphics memory 342 has been allocated as a single contiguous block of storage and that the location to which this single contiguous block of storage has been mapped occupies as few banks as possible in embodiments in which memory device 340a is made up of multiple banks. Minimizing the number of memory devices (such as memory devices 340a–c) and/or the number of banks within a memory device (such as memory device 340a) that are occupied by even a portion of graphics memory 342 aids in maximizing the number of banks and/or memory devices that do not contain even a portion of graphics memory 342, thereby maximizing the number of banks and/or memory devices that may be placed in a lower power state without impairing access to graphics memory 342 to read out graphics data for purposes of refreshing a display of graphics data.

In some embodiments having an allocation of system and graphics memory that resembles FIG. 3a, when memory system 300 is placed into a lower power state, memory devices 340b and 340c are placed into a lower power state, such as self-refresh mode, while only a portion of memory device 340a occupied by system memory 341a is placed in a lower power state if memory device 340a in a given embodiment supports having only a portion of the memory cells within memory device 340a being placed in a lower power state while another portion of memory cells within memory device 340a is not placed in a lower power state. In such embodiments having the benefit of such support provided by memory device 340a, the portions of memory device 340a that are and are not placed in a lower power state may be defined by the number of banks of memory cells within memory device 340a as well as which banks are occupied solely by system memory 341a. Alternatively, in embodiments where memory device 340a is such that either all of memory device 340a must be placed in a lower power state, or not, it may be that only memory devices 340b and 340c are placed in a lower power state, while memory device 340a is not placed in a lower power state. Allowing at least the portion of memory device 340a to continue to operate normally, rather than being placed in a lower power state, allows the graphical data contained within graphics memory 342 to be read out on a regularly timed basis to support the refreshing of an image presented on a display device (not shown) coupled to graphics controller 320.

Similarly, in some embodiments having an allocation of system and graphics memory that resembles FIG. 3b, when memory system 300 is placed into a lower power state, memory devices 340b and 340c are placed into a lower power state, such as self-refresh mode, while only portions of memory device 340a occupied by system memory 341a1 and 341a2 are placed in a lower power state if memory device 340a in a given embodiment supports having only a portion of the memory cells within memory device 340a being placed in a lower power state while another portion of memory cells within memory device 340a is not placed in a lower power state. Alternatively, in embodiments where memory device 340a is such that either all of memory device 340a must be placed in a lower power state, or not, it may be that only memory devices 340b and 340c are placed in a lower power state, while memory device 340a is not placed in a lower power state.

Figure 4:
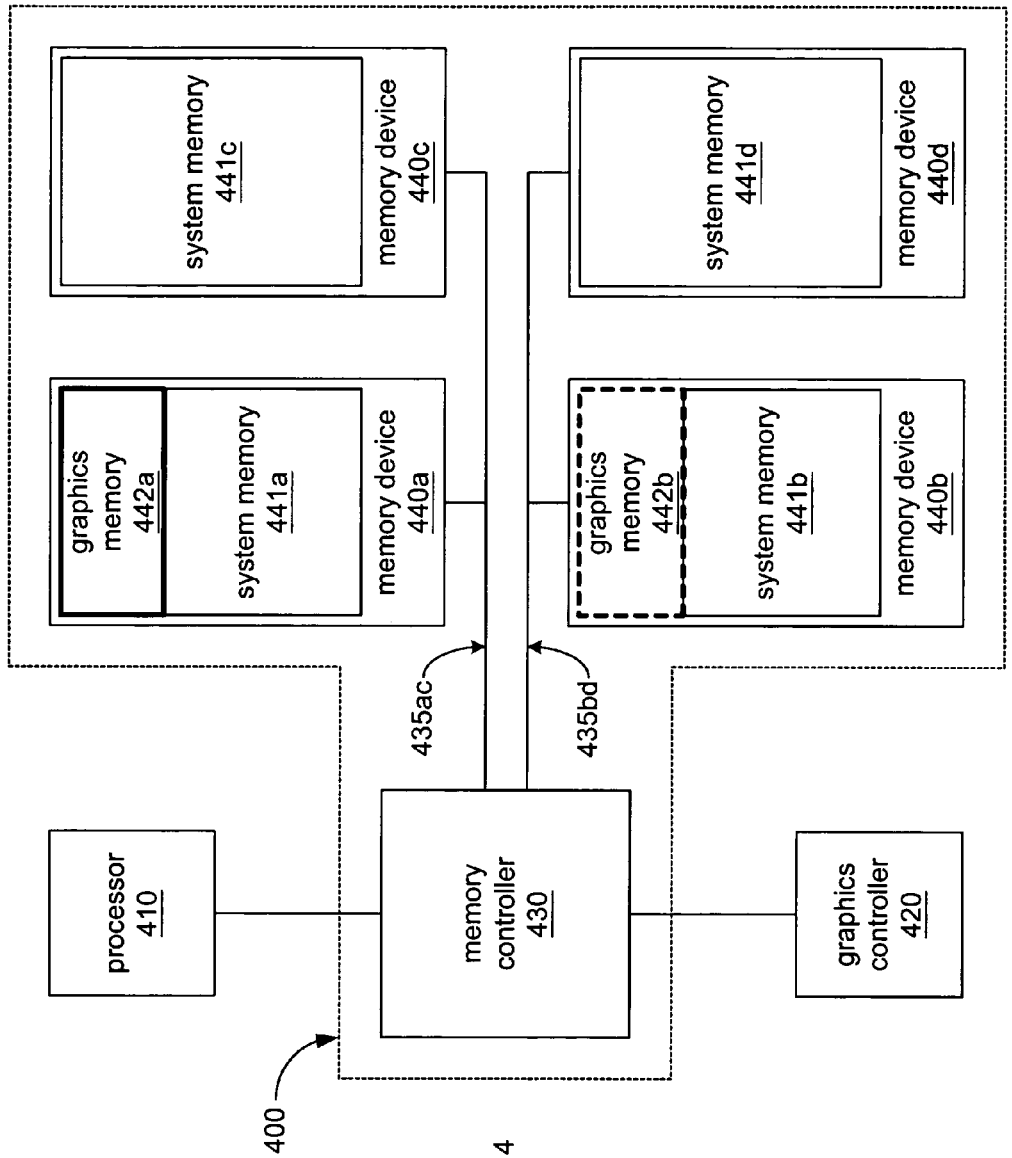
FIG. 4 is a block diagram of another embodiment employing a computer system.

FIG. 4 is a simplified block diagram of embodiments employing a memory system. Memory system 400 is made up, at least in part, of memory controller 430, memory devices 440a and 440c coupled to memory controller 430 via memory bus 435ac, and memory devices 440b and 440d coupled to memory controller 430 via memory bus 435bd. Those skilled in the art of the design of memory systems will readily recognize that FIG. 4 depicts but one example of a memory system, and that alternate embodiments are possible in which the exact arrangement and configuration of components may be reduced, augmented or otherwise altered without departing from the spirit and scope of the present invention as hereinafter claimed.

Memory controller 430 controls the functions carried out by memory devices 440a–d as part of providing access to memory devices 440a–d to at least processor 410 and graphics controller 420, both of which are coupled to memory controller 430. Specifically, processor 410 and/or graphics controller 420 issue commands to memory controller 430 to store data within one or more of memory devices 440a–d, and to retrieve stored data from one or more of memory devices 440a–d. Memory controller 430 receives these commands and relays them to memory devices 440a–c in a format having timing and protocols compatible with memory buses 435ac and 435bd. In effect, memory controller 430 coordinates accesses made to memory cells within memory devices 440a–d in answer to read and write commands from processor 410 and/or graphics controller 420.

In various embodiments, memory controller 430 may be designed and/or configured to use both memory buses 435ac and 435bd simultaneously in such a way as to interleave data in a 2:1 form of interleaving to increase the speed at which read and/or write operations to store and/or retrieve data may be carried out, as those skilled in the art will find readily familiar. Such interleaving may be deemed particularly desirable for system memory 441a–d, allowing processor 410 faster access to machine-readable instructions and/or data within memory devices 440a–d. In some embodiments, as will be discussed in greater detail, it may be deemed desirable for the sake of reductions in power consumption to not provide graphics controller 420 with the benefit of such interleaving, and graphics data may be stored only in graphics memory 442a with system memory 441b occupying all of memory device 440b. However, in other embodiments, graphics controller 420 may also be provided with the benefit of such interleaving, and graphics data may be interleaved across both graphics memory 442a and 442b. However, as those skilled in the art will understand, despite the physical splitting of graphical data into two separate blocks in graphics memories 442a and 442b, these two blocks are accessed and controlled in a manner largely identical to a single contiguous block, thereby affording the opportunity to employ the advantages afforded by graphical data being stored as a single block to limit the number of memory devices and/or banks of memory cells within memory devices that are occupied by graphical data for the sake of reductions in power in a manner similar to what is discussed elsewhere herein with regard to other embodiments, and as will be discussed more fully with regard to memory system 400.

Memory buses 435ac and 435bd may be made up of various separate address, control and/or data signal lines to communicate addresses, commands and/or data, either on separate conductors or on shared conductors in different phases occurring in sequence over time in a multiplexed manner. Alternatively, or perhaps in conjunction with such separate signal lines, addresses, commands and/or data may be encoded for transfer in various ways and/or may be transferred in packets. Memory buses 435ac and 435bd may also communicate address, command and/or data parity signals, and/or error checking and correction (ECC) signals. As those skilled in the art will readily recognize, many forms of timing, signaling and protocols may be used in communications across memory buses 435ac and 435bd. The exact quantity and characteristics of the various signal lines making up various possible embodiments of memory buses 435ac and 435bc may be configured to be interoperable with any of a number of possible memory interfaces. Each of memory devices 440a–d are made up of one or more memory ICs, in which there are one or more banks of memory cells organized into arrays. Memory devices 440a–c may each be made up of a single integrated circuit or multiple integrated circuits.

In some embodiments having an allocation of system and graphics memory in which graphical data occupies both memory devices 440a and 440b as graphics memory 442a and 442b, respectively, when memory system 400 is placed into a lower power state, memory devices 440c and 440d are, in their entirety, placed into a lower power state such as self-refresh mode, while only a portion of memory devices 440a and 440b occupied by system memory 441a and 441b, respectively, are placed in a lower power state if memory devices 440a and 440b in a given embodiment support having only a portion of the memory cells within memory devices 440a and 440b being placed in a lower power state while another portion of memory cells within memory devices 440a and 440b are not placed in a lower power state. In such embodiments having the benefit of such support provided by memory devices 440a and 440b, the portions of memory devices 440a and 440b that are and are not placed in a lower power state may be defined by the number of banks of memory cells within memory devices 440a and 440b, as well as which banks are occupied solely by system memories 441a and 441b, respectively. Alternatively, in embodiments where memory devices 440a and 440b are such that either all of memory devices 440a and 440b must be placed in a lower power state, or not, it may be that only memory devices 440c and 440d are placed in a lower power state, while memory devices 440a and 440b are not placed in a lower power state. Allowing at least the portion of memory devices 440a and 440b having graphics memories 442a and 442b, respectively, to continue to operate normally, rather than being placed in a lower power state, allows the graphical data contained within graphics memories 442a and 442b, respectively, to be read out on a regularly timed basis to support the refreshing of an image presented on a display device (not shown) coupled to graphics controller 420.

Similarly, in some embodiments having an allocation of system and graphics memory in which graphical data occupies only memory device 440a as graphics memory 442a, when memory system 400 is placed into a lower power state, memory devices 440b–d are placed into a lower power state, such as self-refresh mode, while only a portion of memory device 440a occupied by system memory 441a is placed in a lower power state if memory device 440a in a given embodiment supports having only a portion of the memory cells within memory device 440a being placed in a lower power state while another portion of memory cells within memory device 440a is not placed in a lower power state. Alternatively, in embodiments where memory device 440a is such that either all of memory device 440a must be placed in a lower power state, or not, it may be that only memory devices 440b–d are placed in a lower power state, while memory device 440a is not placed in a lower power state. Regardless of whether or not a portion of memory device 440a is placed into a lower power state, the placing of both memory devices 440b and 440d into a lower power state affords the opportunity to also place memory bus 435bd into a lower power state, providing a still further reduction in power consumption by memory system 400.

Figure 5:
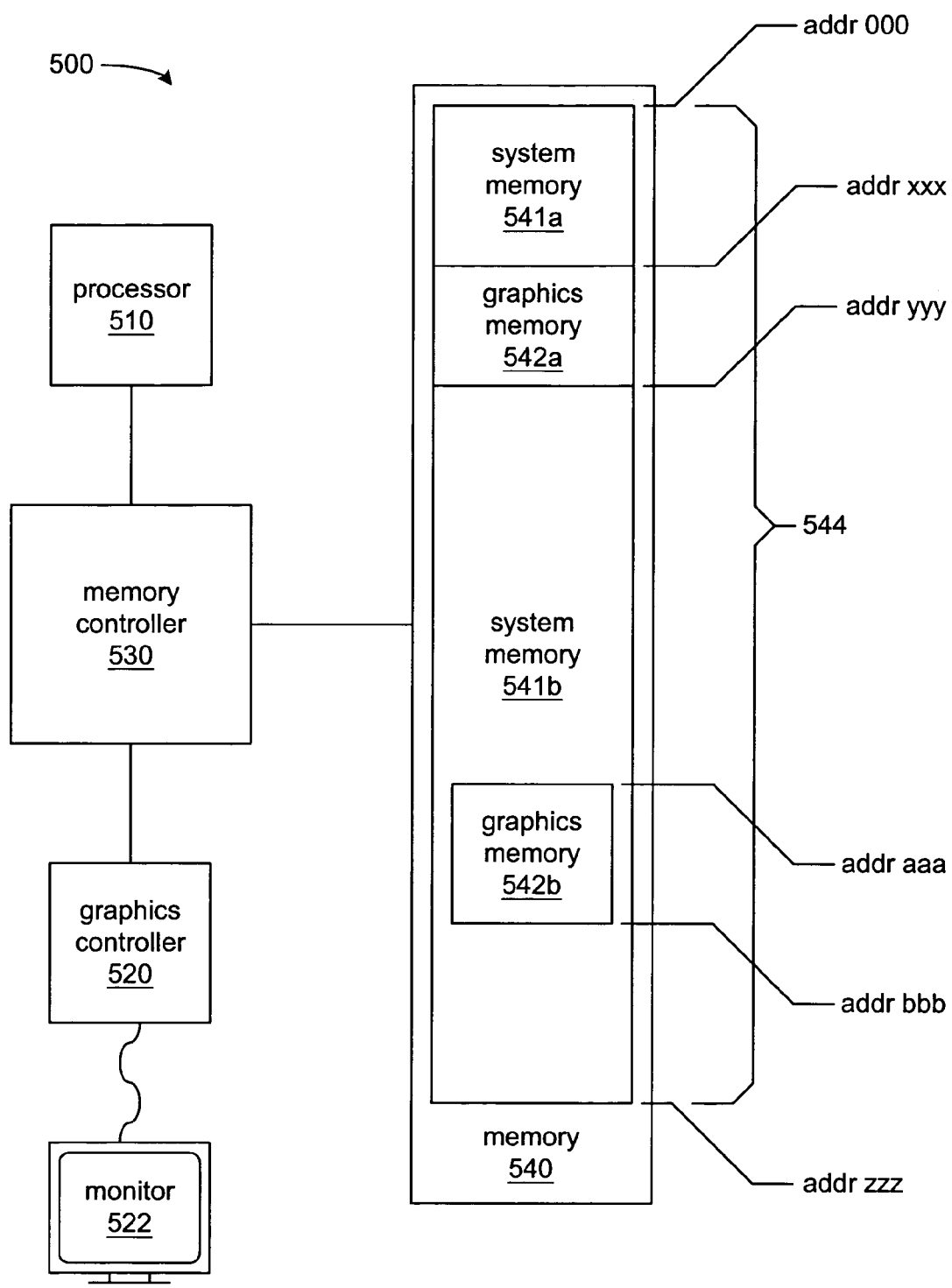
FIG. 5 is a block diagram of another embodiment employing a computer system and detailing a memory map.

FIG. 5 is another block diagram of an embodiment employing a computer system. In a manner not unlike computer system 100 of FIG. 1, computer system 500 is, at least in part, made up of processor 510, graphics controller 520, memory controller 530 and memory 540. Memory controller 530 is coupled to both processor 510 and graphics controller 520, and provides both processor 510 and graphics controller 520 with access to memory 540 to which memory controller 530 is also coupled. Graphics controller 520 is further coupled to monitor 522, and provides image data retrieved from memory 540 to monitor 522 to be displayed by monitor 522. In various embodiments, processor 510 could be any of a variety of types of processor, and there could be more than one processor. In various embodiments, memory 540 could be made up of one or more memory devices of any of a variety of memory technologies, and memory controller 530 provides an appropriate interface for memory 540, regardless of the type of memory.

Memory map 544, with starting and ending addresses 000 to zzz, depicts a possible example of allocation of memory space within memory 540 applicable to various possible embodiments. As depicted, the portion of the memory space within memory 540 allocated as system memory is split into system memory 541a (from address 000 to address xxx) and system memory 541b (from address yyy to address zzz), surrounding graphics memory 542a which is the portion of the memory space within memory 540 allocated as graphics memory (from address xxx to address yyy). In various possible embodiments, the allocation of portions of memory 540 as system and/or graphics memory may be carried out by a processor (perhaps processor 510) executing code such as firmware within a nonvolatile memory device on a circuitboard to which the processor has access, or such as an operating system loaded from some form of media in preparation for normal operation of computer system 500 under the control of the operating system. Regardless of the mechanism by which space within memory 540 is allocated, graphics memory 542a, in a manner similar to graphics memory 142 of FIG. 1, is allocated as a single contiguous block and is mapped within memory map 544 so as to have single pair of starting and ending addresses within memory map 544 (i.e., address xxx and address yyy) to attempt to cause graphics memory 542a to occupy as few memory ICs and/or as few banks within one or more memory ICs as possible. Thus, the allocation of graphics memory 542a as a single block reduces the number of banks within one or more memory devices and/or reduces the number of memory devices that cannot be placed in a lower power state while still allowing graphics data to be read out at regular intervals to maintain an image on monitor 522.

Unlike memory map 144 of FIG. 1, however, memory map 544 also depicts a dynamically allocated block of graphics data at addresses aaa to bbb, namely graphics memory 542b. Graphics memory 542b is dynamically allocated within system memory, such as system memory 541b, on an "as needed" basis to support carrying out complex graphics tasks by graphics controller 520 that go beyond simply maintaining an image on monitor 522, such as texture mapping, motion video decompression, multidimensional modeling, etc. The size of graphics memory 542b may be enlarged or reduced as graphics operations require, or may be eliminated, altogether, when no longer needed. Such dynamic allocation of graphics memory 542b may, in various embodiments, be carried out by memory management code in an operating system used to carry out various maintenance tasks in support of the use of system memories 541a and 541b by processor 510. In various embodiments, the need for graphics memory 542b to be allocated may or may not arise depending on the tasks computer system 500 is employed to carry out by a user of computer system 500. By way of example, were a user of computer system 500 to play a video game using computer system 500, a need may then be created to support the display of motion video and/or rendered three-dimensional images, requiring a greater quantity of graphics memory than is already allocated for graphics memory 542a, and in such an example, graphics memory 542b may be dynamically allocated to address such additional needs, at least until the user of computer system 500 ceases playing the video game.

In some embodiments, the allocation within memory map 544 of system memories 541a and 541b, and graphics memory 542a may be carried out under the control of a setup software, perhaps executed by processor 510, at a time prior to the normal operation of computer system 500. Such setup software may permit a user of computer system 500 to specify how much of memory 540 the user wishes to allocate to graphics memory 542a, perhaps to ensure that graphics memory 542a is large enough to provide the function of a frame buffer to maintain an image to be displayed on monitor 522. Such setup software may also store data concerning the sizes and/or addresses of each of system memories 541a and 541b, and graphics memory 542a in some form of nonvolatile memory (not shown) where this data could later be retrieved by an operating system or other software being executed during normal operation of computer system 500.

In various embodiments, the selection of which banks within a memory device and/or which memory devices making up memory 540 will be permitted to enter into a lower power state such that an image is still presented on monitor 522 may be determined through a setup software, perhaps executed by processor 510, at a time prior to the normal operation of computer system 500. Such setup software may derive such a selection of banks and/or memories devices from the settings specified by a user of computer system 500 concerning the size and/or location of graphics memory 542a within memory map 544. Such setup software may also store data concerning these selections in some form of nonvolatile memory where this data could later be retrieved by an operating system or other software being executed during normal operation of computer system 500.

In some embodiments, an operating system software governs the dynamic allocation of graphics memory 542b in response to data indicating the sizes and/or addresses of each of system memories 541a and 541b, and graphics memory 542a, as well as indications of changing demands for graphics operations being carried out by graphics controller 520, such that more graphics memory than is allocated to graphics memory 542a may be needed from time to time during the normal operation of computer system 500. Such data concerning the sizes and/or addresses of each of system memories 541a and 541b, and graphics memory 542a may be provided to the operating system software by a setup software, perhaps through values stored in a nonvolatile memory, or may be obtained more directly from a user of computer system 500 through a setup utility that is part of the operating system at a time when the operating system is being installed on computer system 500, when the operating system is being initialized as computer system 500 is "booted" or otherwise initialized, and/or during normal operation of computer system 500 under the control of the operating system.

In various embodiments, a power management software, perhaps integrated into an operating system software, may retrieve data concerning selections made through other software concerning which banks within memory devices and/or which memory devices making up memory 540 may be placed in a lower power state at a time when computer system 500 is placed in a lower power state that still permits an image to be maintained on monitor 522. In various embodiments, such power management software may interrogate memory controller 530 and/or other components of computer system 500 to derive needed information concerning which banks within memory devices and/or which memory devices may be placed in a lower power state. Alternatively, such power management software may not retrieve or derive such data concerning such selections, but may instead, simply signal one or more components of computer system 500 (perhaps including memory controller 130) to place computer system 500 in a lower power state that still allows an image to be maintained on monitor 522, while relying on those one or more components to have already been configured, perhaps by a setup software, to avoid placing banks of memory devices and/or memory devices needed to maintain an image on monitor 522 in a lower power state.

Although a single block of dynamically allocated graphics memory, namely graphics memory 542*b*, is depicted in FIG. 5, those skilled in the art will readily recognize dynamic allocation of memory for various purposes may result in a multitude of smaller blocks of memory being allocated for a particular function in a manner that results in those smaller blocks being spread throughout available locations in a memory, rather than a single contiguous block such as graphics memory 542*b*. Therefore, in various embodiments, graphics memory 542*b* may be but one of multiple dynamically allocated blocks of graphics memory.

In various embodiments, entry into a lower power state in which an image is maintained on monitor 522 results in the banks of memory and/or the memory devices in which graphics memory 542*a* is allocated not being placed into a lower power state, while other banks of memory and/or memory devices are placed into a lower power state with the result that the banks of memory and/or memory devices in which graphics memory 542*b* and/or other blocks of dynamically allocated graphics memory are also placed into a lower power state. This may be done based on the presumption that computer system 500 is being placed into a lower power state as a result of lack of use by a user of computer system 500 for a predetermined period of time, and therefore, carrying out graphics operations beyond simply maintaining an image on monitor 522 is unnecessary. As a result, such graphics operations as the rendering of three-dimensional images and/or the playback of motion video may be halted with images on monitor 522 that are attributable to those operations simply being "frozen"; in the state that they were in at the time that computer system 500 entered a lower power state. However, in other embodiments, entry into a lower power state in which an image is maintained on monitor 522 may actually be prohibited at times when a block of graphics memory, such as graphics memory 542*b*, has been dynamically allocated. This prohibition may be followed based on the presumption that if a user of computer system 500 has chosen to employ computer system 500 in carrying out a task requiring graphics operations that require more graphics memory than is available within graphics memory 542*a*, only, then it should be presumed that computer system 500 is being thoroughly utilized by such a user (perhaps, ignoring a lack of input from a user being detected) and should not be placed into a lower power state that may affect the graphics operations that are being carried out.

Figure 6:
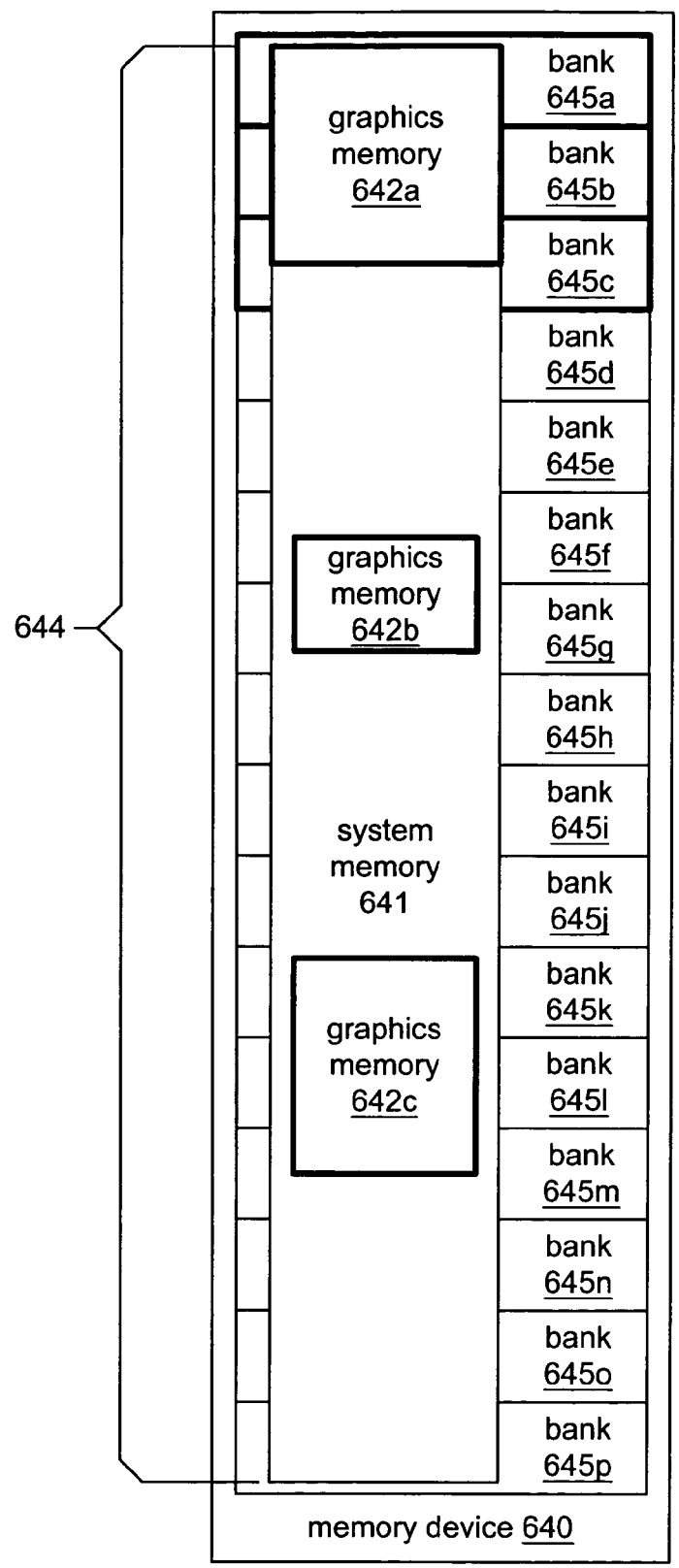
FIG. 6 depicts another embodiment employing a memory map.

FIG. 6 is a block diagram of embodiments employing a memory device. Memory device 640 is depicted as being made up of 16 banks of memory cells, namely banks 645*a* through 645*p*, although those skilled in the art will readily recognize that memory device 640 may be made up of any number of banks of memory cells. In various embodiments, each of banks 645*a–p* is made up of at least one two-dimensional array of rows and columns of memory cells, and each bank is separately addressable.

In a manner not unlike memory map 244 of FIGS. 2*a* and 2*b*, memory map 644 in FIG. 6 is overlaid atop the block depiction of banks 645*a–p* to illustrate how system memory 641 and graphics memory 642*a* are allocated among banks 645*a–h*. Specifically, system memory 641 containing data for use by a processor (not shown) occupies only part of bank 645*c* and all of banks 645*d–p*, while graphics memory 642*a* containing data for use by a graphics device (also not shown) occupies all of banks 645*a–b* and only part of bank 645*c*. However, as those skilled in the art will readily recognize, these specific mappings of allocation of storage for a combination of system and graphics memory are but examples, and many other mappings of combinations of system and graphics memory are possible. Graphics memory 642*a* is allocated as a single contiguous block and is positioned within memory map 644 to occupy as few banks of memory device 640 as possible.

In addition to graphics memory 642*a*, additional blocks of graphics memory may be dynamically allocated within system memory 641 on an "as needed" basis to satisfy requirements for a quantity of graphics memory beyond what is provided by graphics memory 642*a*, namely graphics memories 642*b* and 642*c*. This depiction of graphics memories 642*b* and 642*c* within system memory 641 could be described as a "snapshot" in time, since dynamic allocation is employed to supply additional graphics memory wherever space is available within system memory 641 at a given time and then is removed when no longer needed. Although two specific blocks of dynamically allocated graphics memory are depicted, it will be readily appreciated by those skilled in the art that dynamic allocation may result in a multitude of relatively small blocks of graphics memory dispersed throughout system memory 641.

In some embodiments, when a computer system or other electronic device of which memory device 640 is a part is placed into a lower power state, banks of memory occupied only by system memory 641 (i.e., banks 645*d* through 645*p*) are placed in a lower power state, while banks of memory even partly occupied by graphics memory 642*a* are not placed in a lower power state in order to ensure that graphics data that must be accessible for being read out of memory device 640 at regular intervals to maintain an image on a display device (not shown) remains accessible. As banks 645*d* through 645*p* are placed into a lower power state, graphics memories 642*b* and 642*c* that are dynamically allocated within system memory 641 become inaccessible, along with other contents of system memory 641. It may be in such embodiments that a presumption is made that graphics functions that require the dynamic allocation of graphics memory beyond what is provided by graphics memory 642*a* are "extra" graphics functions that are amenable to being temporarily stopped for the sake of reducing power consumption, either without undesirable results, or with undesirable results that are deemed acceptable. Indeed, it may be the case that certain graphics functions are designated as being amenable to such a stoppage, and are therefore, the only graphics functions to which graphics memory is dynamically allocated within system memory 641, while other graphics functions deemed to not be so amenable to such stoppage are provided with graphics memory from within graphics memory 642*a*.

Given that in such embodiments, the effect of the stoppage of some graphics functions may have the result of causing, for example, the playback of motion video or the rendering of a three-dimensional object to visibly freeze, which graphics functions are deemed amenable to such stoppage may differ from one electronic device of which memory device 640 is a part to another. In some variations of such embodiments, it may be that a user of such an electronic device may be provided with an opportunity to choose which graphics functions will be supported with dynamically allocated graphics memory which would make them subject to such stoppages. In other variations of such embodiments, it may be that a user of such an electronic device may be provided with an opportunity to increase the size of graphics memory 642a (thereby causing a corresponding decrease in the size of system memory 641) as a way to ensure that more graphics functions are supported with graphics memory provided within graphics memory 642a as a way to avoid stoppages of graphics functions that the user deems to be undesirable.

In some embodiments, entry into a lower power state may be entirely precluded, or at least the placing of memory device 640 into a lower power state may be precluded, while one or more blocks of graphics memory (such graphics memories 642b and 642c) are dynamically allocated within system memory 641 in order to avoid any stoppage of graphics functions. It may be that in such embodiments, a presumption is made that when a user of a computer or other electronic device of which memory device 640 is a part employs a graphics function requiring the dynamic allocation of graphics memory beyond what is provided by graphics memory 642a, such a user will not want that graphics function to be interrupted by the onset of a lower power state in which that dynamically allocated graphics memory is caused to become inaccessible to reduce power consumption. Indeed, such a computer or electronic device may be configured to ignore a lack of activity through a keyboard, mouse, touchpad, and/or other input device beyond predetermined amount of time as an indicator of lack of use of such a computer or other electronic device. In some variations of such embodiments, it may be that a user of such a computer or other electronic device is provided with an opportunity to specify what forms of graphics activity should not be interrupted by an entry into a lower power state.

Figure 7:
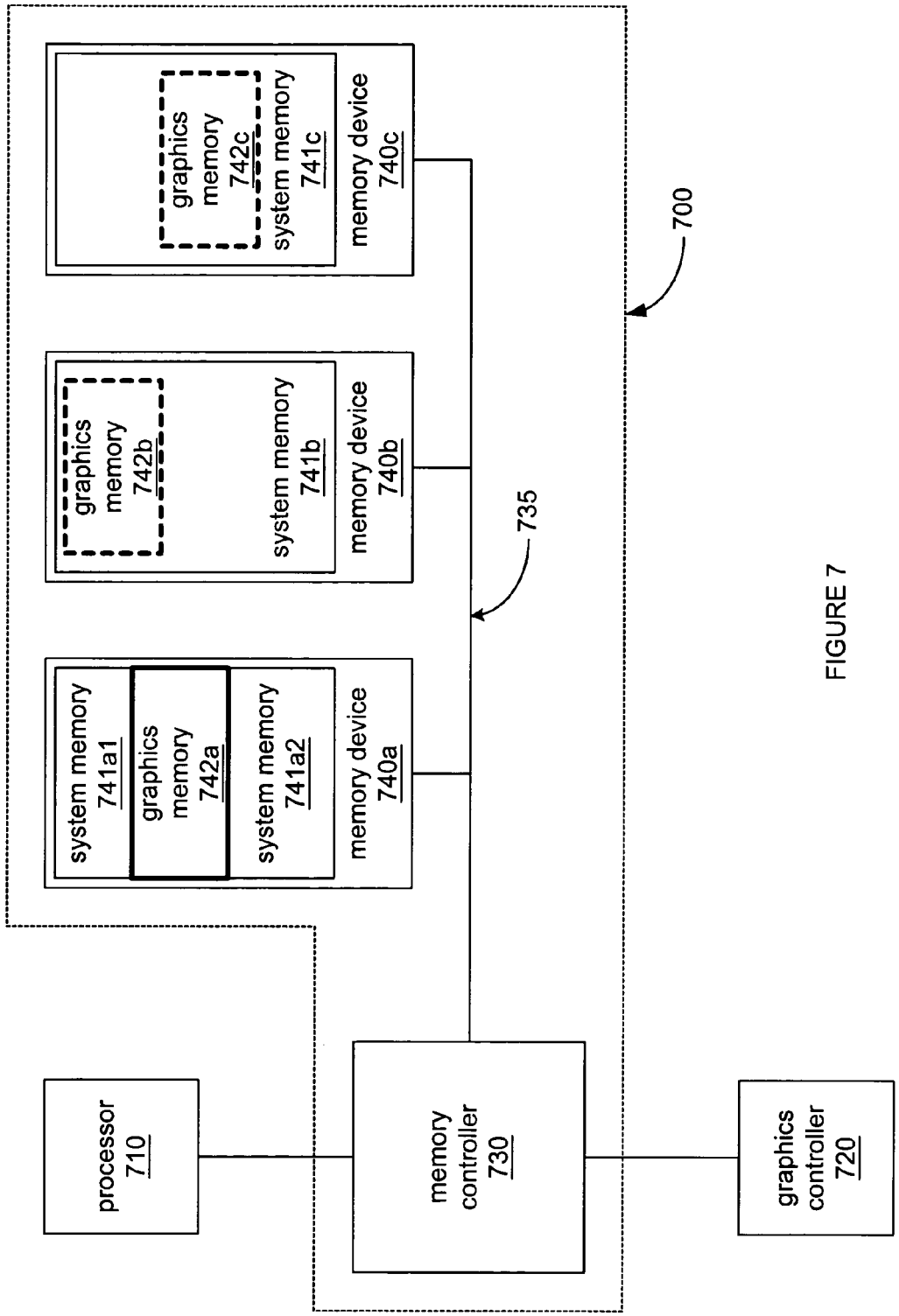
FIG. 7 is a block diagram of still another embodiment employing a computer system.

FIG. 7 is a simplified block diagram of embodiments employing a memory system. Memory system 700 is, at least in part, made up of memory controller 730 and memory devices 740a–c coupled together via memory bus 735. Those skilled in the art of the design of memory systems will readily recognize that FIG. 7 depicts an example of a relatively simple memory system, and that alternate embodiments are possible in which the exact arrangement and configuration of components may be reduced, augmented or otherwise altered without departing from the spirit and scope of the present invention as hereinafter claimed. Memory controller 730 controls the functions carried out by memory devices 740a–c as part of providing access to memory devices 740a–c to at least processor 710 and graphics controller 720, both of which are coupled to memory controller 730. Specifically, processor 710 and/or graphics controller 720 issue commands to memory controller 730 to store data within one or more of memory devices 740a–c, and to retrieve stored data from one or more of memory devices 740a–c. Memory controller 730 receives these commands and relays them to memory devices 740a–c in a format having timing and protocols compatible with memory bus 735.

Each of memory devices 740a–c is made up of one or more memory ICs, in which there are one or more banks of memory cells organized into arrays. In various possible embodiments, each of memory devices 740a–c may be implemented in the form of a SIMM (single inline memory module), SIPP (single inline pin package), DIMM (dual inline memory module), or any of a variety of other forms as those skilled in the art will recognize. In such embodiments, as those skilled in the art will recognize, one or more of memory device 740a–c may be an assemblage of multiple memory ICs that operate in parallel (i.e., "side-by-side") in a manner in which all of these memory ICs in the assemblage receive the same addresses and commands, but are individually coupled to different subsets of the full width of a data bus.

System memories 741b and 741c occupy all of memory devices 740b and 740c, respectively, while memory device 740a is allocated for system memories 741a1 and 741a2, as well as graphics memory 742a. Although this specific mapping is depicted in FIG. 7, those skilled in the art will readily recognize that many other mappings of combinations of system and graphics memory are possible. Of importance is that graphics memory 742a has been allocated as a single contiguous block of memory and that the location to which this block of memory has been mapped occupies as few memory devices as possible (and as few memory banks as possible in the case of embodiments in which memory device 740a is made up of multiple banks). Also depicted in FIG. 7 are blocks of memory dynamically allocated to support graphics functions requiring more graphics memory than available within graphics memory 742a, namely graphics memories 742b and 742c. Minimizing the number of memory devices (such as memory devices 740a–c) and/or the number of banks within a memory device (such as memory device 740a) that are occupied by even a portion of graphics memory 742a aids in maximizing the number of banks and/or memory devices that do not contain even a portion of graphics memory 742a, thereby maximizing the number of banks and/or memory devices that may be placed in a lower power state without impairing access to graphics memory 742a to read out graphics data for purposes of refreshing a display of graphics data.

In some embodiments, when memory system 700 is placed into a lower power state, memory devices 740b and 740c are placed into a lower power state, such as self-refresh mode, while only portions of memory device 740a occupied by system memories 741a1 and 741a2 are placed in a lower power state if memory device 740a in a given embodiment supports having only a portion of the memory cells within memory device 740a being placed in a lower power state while another portion of memory cells within memory device 740a is not placed in a lower power state. In such embodiments having the benefit of such support provided by memory device 740a, the portions of memory device 740a that are and are not placed in a lower power state may be defined by the number of banks of memory cells within memory device 740a as well as which banks are occupied solely by graphics memory 742a, as well as by system memories 741a1 and 741a2. Alternatively, in embodiments where memory device 740a is such that either all of memory device 740a must be placed in a lower power state, or not, it may be that only memory devices 740b and 740c are placed in a lower power state, while memory device 740a is not placed in a lower power state.

Allowing at least the portion of memory device 740a having graphics memory 742a in such embodiments to continue to operate normally, rather than being placed in a lower power state, allows the graphical data contained within graphics memory 742a to be read out on a regularly timed basis to support the refreshing of an image presented on a display device (not shown) coupled to graphics controller 720. However, the placing of memory devices 740b and 740c into a lower power state makes graphics memories 742b and 742c allocated within system memories 741b and 741c, respectively, inaccessible, resulting in whatever graphics functions supported by graphics memories 742b and 742c being interrupted, possibly causing otherwise moving or changing portions of the image being displayed on a display device to become frozen.

In other embodiments, the dynamic allocation of either of graphics memories 742b and 742c within system memories 741b and 741c, respectively, results in the preclusion of the placing of memory system 700 into a lower power state until no such blocks of memory dynamically allocated as graphics memory exist.

Figure 8:
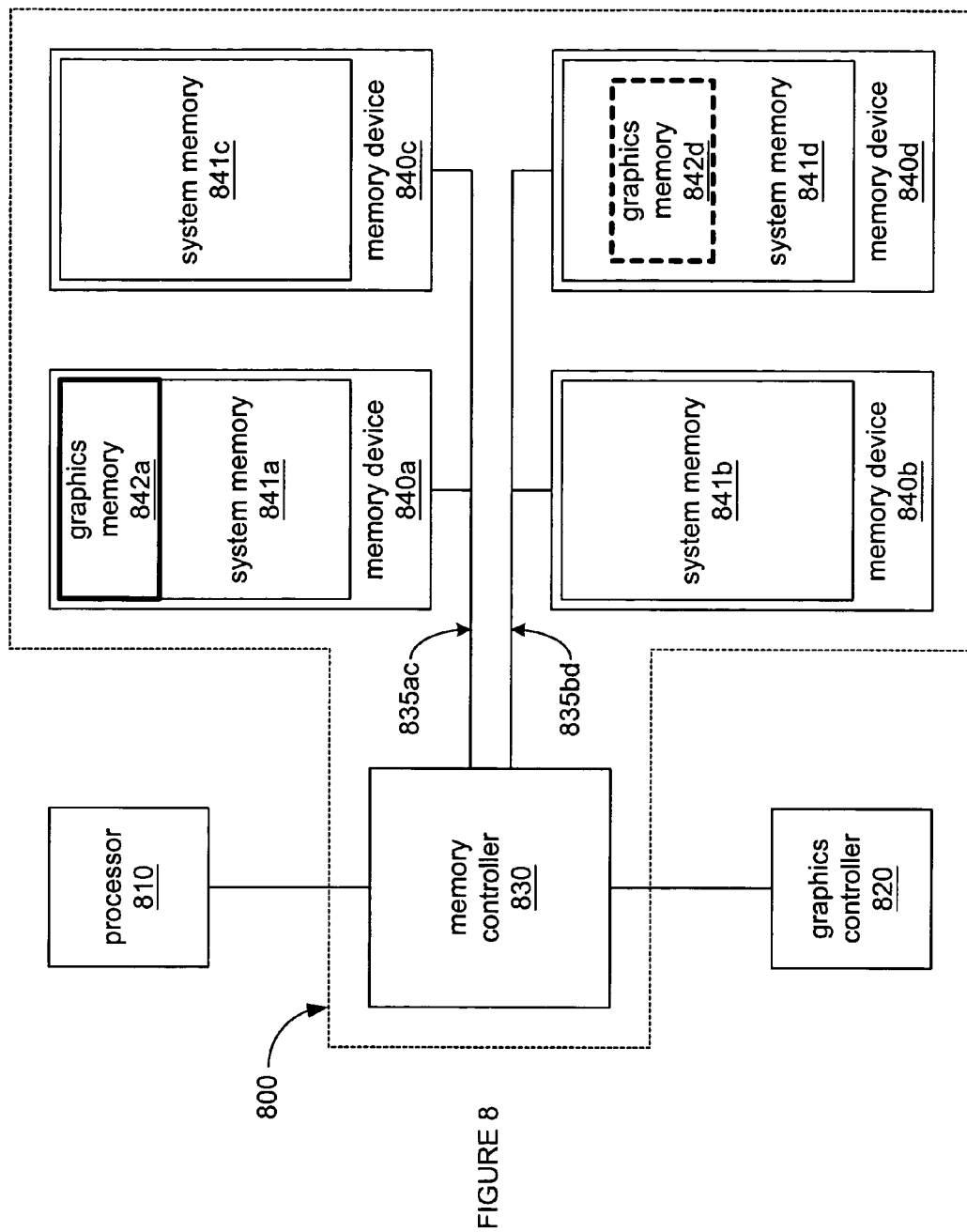
FIG. 8 is a block diagram of yet another embodiment employing a computer system.

FIG. 8 is a simplified block diagram of embodiments employing a memory system. Memory system 800 is, at least in part, made up of memory controller 830, memory devices 840a and 840c coupled to memory controller 830 via memory bus 835ac, and memory devices 840b and 840d coupled to memory controller 830 via memory bus 835bd. Those skilled in the art of the design of memory systems will readily recognize that FIG. 8 depicts but one example of a memory system, and that alternate embodiments are possible in which the exact arrangement and configuration of components may be reduced, augmented or otherwise altered without departing from the spirit and scope of the present invention as hereinafter claimed. Memory controller 830 controls the functions carried out by memory devices 840a–d as part of providing access to memory devices 840a–d to at least processor 810 and graphics controller 820, both of which are coupled to memory controller 830. Specifically, processor 810 and/or graphics controller 820 issue commands to memory controller 830 to store data within one or more of memory devices 840a–d, and to retrieve stored data from one or more of memory devices 840a–d. Memory controller 830 receives these commands and relays them to memory devices 840a–d in a format having timing and protocols compatible with memory buses 835ac and 835bd.

System memories 841b through 841d occupy all of memory devices 840b through 840d, respectively, while memory device 840a is allocated for system memory 841a, as well as graphics memory 842a. Although this specific mapping is depicted in FIG. 8, those skilled in the art will readily recognize that many other mappings of combinations of system and graphics memory are possible. Of importance is that graphics memory 842a has been allocated as a single contiguous block of memory and that the location to which this block of memory has been mapped occupies as few memory devices as possible (and as few memory banks as possible in the case of embodiments in which memory device 840a is made up of multiple banks of memory cells). Also depicted in FIG. 8 is a block of memory dynamically allocated to support graphics functions requiring more graphics memory than available within graphics memory 842a, namely graphics memory 842d.

In various embodiments, memory controller 830 may be designed and/or configured to use both memory buses 835ac and 835bd simultaneously in such a way as to interleave data in a 2:1 form of interleaving to increase the speed at which read and/or write operations to store and/or retrieve data may be carried out, as those skilled in the art will find readily familiar. Such interleaving may be deemed particularly desirable for system memories 841a–d, allowing processor 810 faster access to machine-readable instructions and/or data within memory devices 840a–d. In some embodiments, as will be discussed in greater detail, it may be deemed desirable for the sake of reductions in power consumption to not provide graphics controller 820 with the benefit of such interleaving, and graphics data may be stored only in graphics memory 842a with system memory 841b occupying all of memory device 840b.

In some embodiments, when memory system 800 is placed into a lower power state, memory devices 840b through 840d are placed into a lower power state, such as self-refresh mode, while only a portion of memory device 840a occupied by system memory 841a is placed in a lower power state if memory device 840a in a given embodiment supports having only a portion of the memory cells within memory device 840a being placed in a lower power state while another portion of memory cells within memory device 840a are not placed in a lower power state. In such embodiments having the benefit of such support provided by memory device 840a, what portion(s) of memory devices 840 are and are not placed in a lower power state may be defined by the number of banks of memory cells within memory device 840a, as well as which banks are occupied solely by system memory 841a. Alternatively, in embodiments where memory device 840a is such that either all of memory device 840a must be placed in a lower power state, or not, it may be that only memory devices 840b through 840d are placed in a lower power state, while memory device 840a is not placed in a lower power state. Regardless of whether or not a portion of memory device 840a is placed into a lower power state, the placing of both memory devices 840b and 840d into a lower power state affords the opportunity to also place memory bus 835bd into a lower power state, providing a still further reduction in power consumption by memory system 800.

Allowing at least the portion of memory device 840a having graphics memory 842a to continue to operate normally, rather than being placed in a lower power state, allows the graphical data contained within graphics memory 842a to be read out on a regularly timed basis to support the refreshing of an image presented on a display device (not shown) coupled to graphics controller 820. However, the placing of memory devices 840b through 840d into a lower power state makes graphics memory 842d allocated within system memories 841d inaccessible, resulting in whatever graphics functions supported by graphics memory 842d being interrupted, possibly causing otherwise moving or changing portions of the image being displayed on a display device coupled to graphics controller 820 to become frozen.

In other embodiments, the dynamic allocation of graphics memory 842d within system memory 841d results in the preclusion of the placing of memory system 800 into a lower power state until no such blocks of memory dynamically allocated as graphics memory exist.

Figure 9:
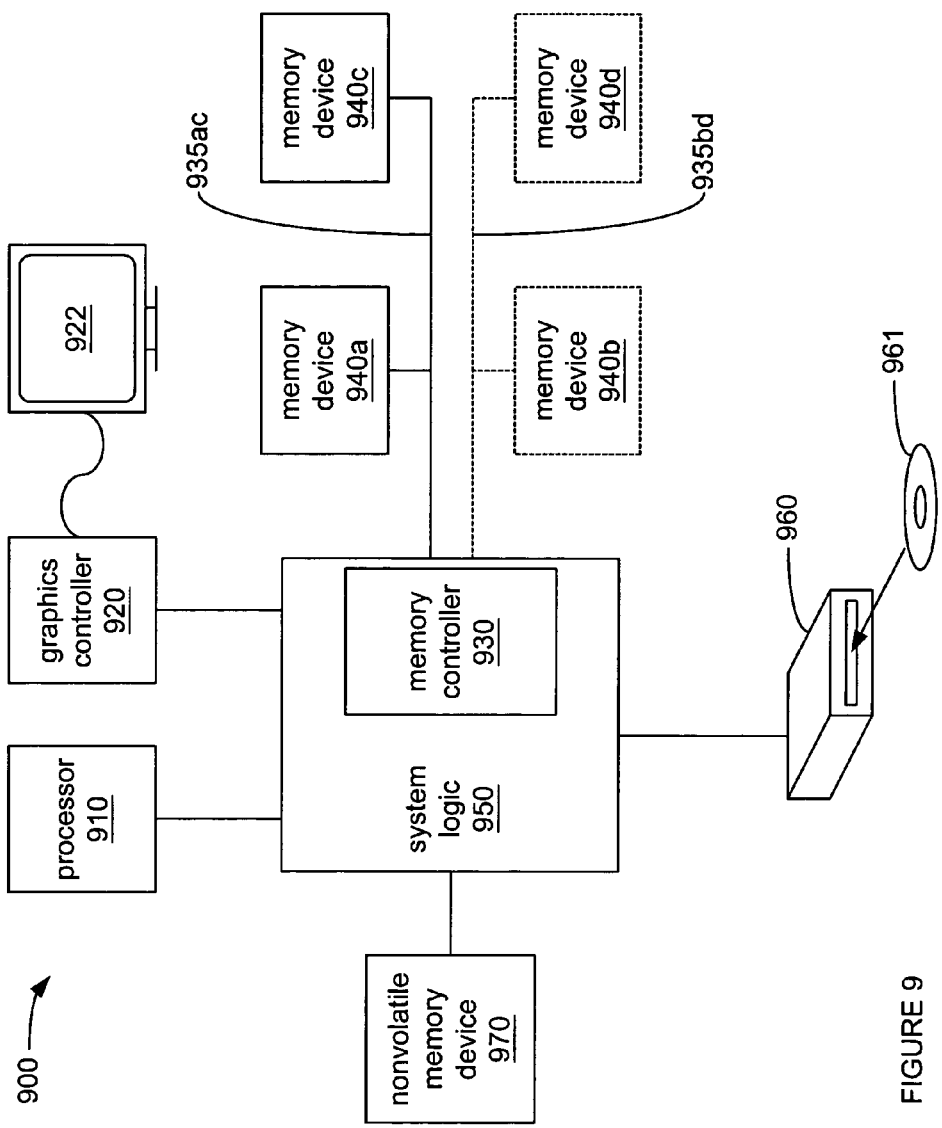
FIG. 9 is a block diagram of still another embodiment employing a computer system and detailing a memory map.

FIG. 9 is a simplified block diagram of an embodiment employing a computer system. Computer system 900 is, at least in part, made up of processor 910, system logic 950, and memory devices 940a–d. System logic 950 is coupled to processor 910 and performs various functions in support of processor 910 including providing processor 910 with access to memory devices 940a–d to which system logic 950 is also coupled via memory buses 935ac and 935bd, using memory controller 930 within system logic 950. Processor 910, system logic 950 and memory devices 940a–d make up a form of core for computer system 900 that is capable of supporting the execution of machine readable instructions by processor 910 and storage of data and instructions within memory devices 940*a*–*c*. Graphics controller 920, coupled to monitor 922, is also coupled to system logic 950, and like processor 910, also relies on memory controller 930 and memory buses 935*ac* and 935*bd* to provide graphics controller 920 with access to memory devices 940*a*–*d* for the storage of graphical data.

In some embodiments, system logic 950 is coupled to and provides processor 910 with access to storage device 960 by which data and/or instructions carried by storage media 961 may be accessed. Storage media 961 may be of any of a wide variety of types and technologies as those skilled in the art will understand, including CD or DVD ROM, magnetic or optical diskette, magneto-optical disk, tape, semiconductor memory, characters or perforations on paper or other material, etc. In some embodiments, nonvolatile memory device 970 is coupled to system logic 950 (or other part of computer system 900) and provides storage for an initial series of instructions executed at a time when computer system 900 is either "reset" or initialized (for example, when computer system 900 is "turned on" or "powered up") to perform tasks needed to prepare computer system 900 for normal use. In some variations of such embodiments, upon initialization or resetting of computer system 900, processor 910 accesses nonvolatile memory device 970 to retrieve instructions to be executed to prepare memory controller 930 for normal use in providing access for processor 910 and/or graphics controller 920 to memory devices 940*a*–*d*. It may be that these same retrieved instructions are executed to prepare system logic 950 for normal use in providing access to storage device 960 and whatever form of storage media 961 that may be used by storage device 960.

In some embodiments, storage media 961 carries machine-accessible instructions that may be executed by processor 910 to cause processor 910 to carry out one or more tests of memory device 940*a*–*d* to determine various characteristics of memory devices 940*a*–*d*, including the number and/or configuration of banks of memory within each of memory device 940*a*–*d*, as well as whether or not any of memory device 940*a*–*d* are able to be only partially placed into a lower power state in which only a portion of such a memory device is placed in a lower power state while a different portion of the same memory device continues to operate normally. Depending on whether a given embodiment of computer system 900 is made up only of at least memory device 940*a*, along with memory bus 935*ac*, or a given embodiment of computer system 900 is made up of at least memory devices 940*a* and 940*b*, as well as both memory buses 935*ac* and 935*bd*, interleaving of at least system memory may be employed.

In embodiments where interleaving of system memory is employed, then any portion of memory devices 940*a* and 940*b* may be accessed and controlled by memory controller 930 to implement interleaving of that system memory, and processor 910 may be caused through the execution of machine-readable instructions to configure memory controller 930 to support this. Furthermore, in such embodiments, graphical data may interleaved across both memory devices 940*a* and 940*b* such that a portion of each of memory devices 940*a* and 940*b* are system memory while another portion of each of memory devices 940*a* and 940*b* are graphics memory. When computer system 900 enters a lower power state in which an image being displayed on monitor 922 is to be maintained, memory devices 940*c* and 940*d* (if present in a given embodiment) are placed in a lower power state. Portions of memory devices 940*a* and 940*b* may also be placed in a lower power state if memory devices 940*a* and 940*b* support having only a portion of their memory cells being placed in a lower power state, and otherwise, memory devices 940*a* and 940*b* are allowed to be operated normally. However, in the case of embodiments in which system memory is interleaved and graphics memory is not, then where graphics memory occupies at least a portion of memory device 940*a*, the entering of computer system 900 into a lower power state will cause memory devices 940*c* and 940*d* (if present) to be placed in a lower power state along with memory device 940*b*, and possibly, memory bus 935*bd*. Memory device 940*a* is placed in a lower power state only if memory device 940*a* supports having only a portion of its memory cells placed in a lower power state, and otherwise, memory device 940*a* is allowed to be operated normally.

In embodiments where interleaving of system memory is not employed, for instance, where memory devices 940*b* and 940*d*, as well as memory bus 935*bd*, are not present, then graphical data may be stored solely within memory device 940*a*, in a single block in a manner consistent with what has been previously discussed. When computer system 900 enters a lower power state in which an image being displayed on monitor 922 is to be maintained, memory device 940*c* (if present in a given embodiment) is placed in a lower power state. Portions of memory device 940*a* may also be placed in a lower power state if memory device 940*a* supports having only a portion of its memory cells being placed in a lower power state, and otherwise, memory device 940*a* is allowed to be operated normally.

Figure 10:
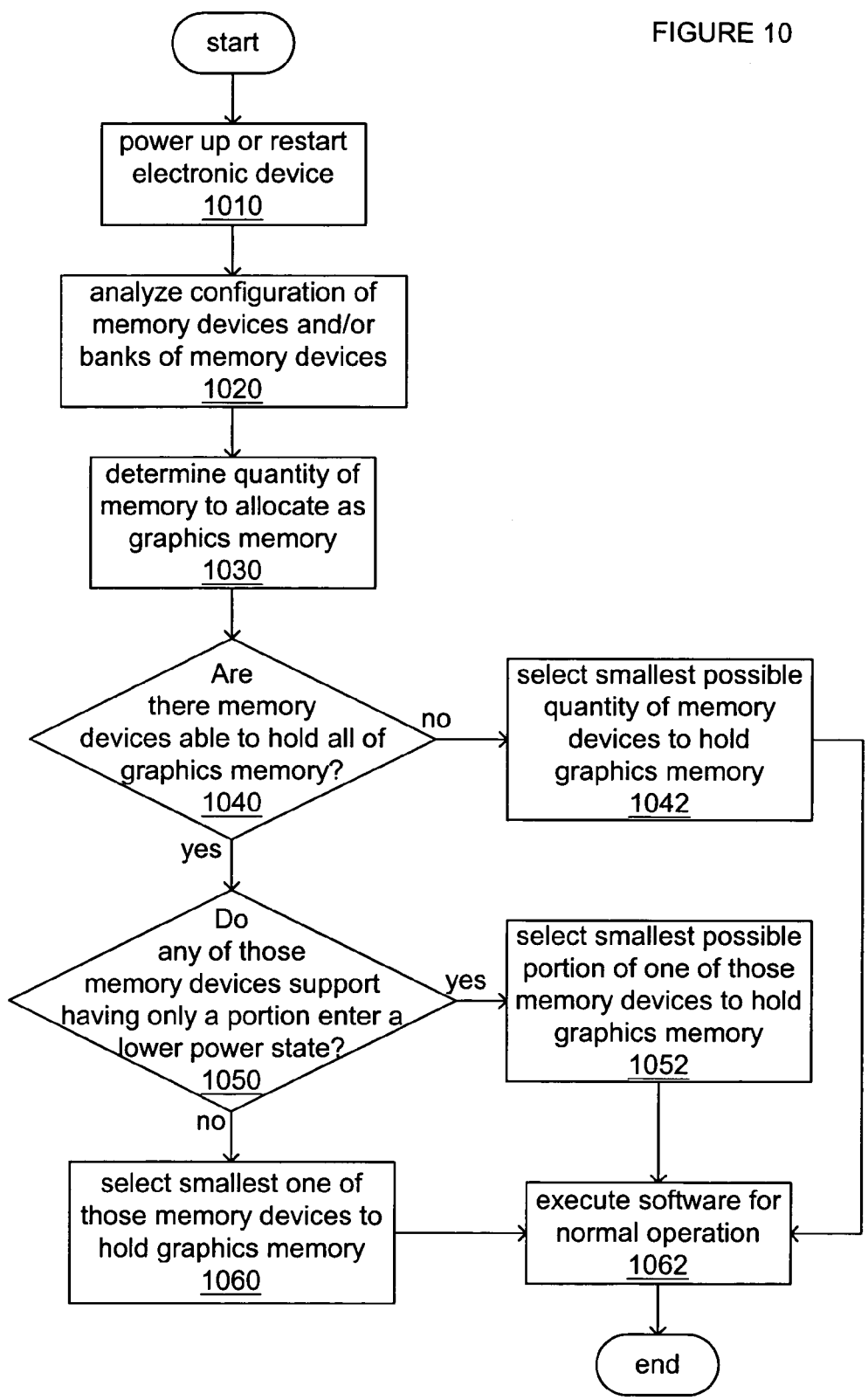
FIG. 10 is a flow chart of embodiments in which graphics memory is allocated.

FIG. 10 is a flowchart of embodiments in which graphics memory is allocated. At 1010, an electronic device is either powered up or restarted (perhaps "reset" by way of pressing a reset button or triggered by software). The quantity, size, etc. of available memory devices, as well as the number of banks per memory device, are analyzed at 1020. In some embodiments, this may entail interrogating and/or testing memory device(s) to determine how many memory devices are present, how many memory cells are within each memory device, how many banks of memory are within each memory device and/or whether or not each memory device supports selectively placing less than all of the banks of memory in a lower power state, etc. For sake of clarity, it should be noted that a memory device may be made up of multiple memory ICs assembled together to operate in parallel in a manner in which all of such paralleled ICs receive the same addresses and commands, but are coupled to subsets of the full width of a data bus—in essence, a parallel set of substantially identical memory ICs assembled side-by-side to act together as if the assembly were a single wider memory IC. At 1030, the quantity of graphics memory to be allocated in preparation for the normal operation of the electronic device is determined. In some embodiments, this entails a user of the electronic device specifying the quantity of graphics memory, directly, through some form of setup software, while in other embodiments, the quantity may be deduced from preferences provided by a user as to which graphics function(s) are not to be interrupted when at least a portion of the available memory is placed into a lower power state. At 1040, a determination is made as to whether or not there is a single memory device able to contain all of the graphics memory, as having the graphics memory contained entirely within one memory device among multiple memory devices may allow all but the one memory device containing the graphics memory to be placed into a lower power state at a time when the electronic device is placed into a lower power state. Alternatively, the question asked at 1040 may be whether or not there is a single memory device that would be a desirable choice to contain all of the graphics memory. If there is no one memory device large enough (or desirable enough) to contain the graphics memory, then at 1042, available space within the available memory devices is allocated such that as few memory devices as possible are employed to contain the graphics memory, before the execution of software for the normal operation of the electronic device (such as operating system software) begins at 1062. However, if there is a single memory device that is large enough (or desirable enough) to contain all of the graphics memory, then at 1050, a determination is made as to whether or not one of those large memory devices supports having only a portion of the memory device (such as a subset of the banks within the memory device) placed into a lower power state. If the memory device provides such support, then the smallest portion (such as the smallest number of banks) possible is selected for use in containing the graphics memory at 1052, before the execution of software for normal operation begins at 1062. However, if the memory device does not provide such support, then at 1060, the smallest one of those memory devices able to contain all of the graphics memory is selected to contain the graphics memory, before the execution of software for normal operation begins at 1062.

Regardless of whether or not there is a single memory device able to contain all of the graphics memory, the choice of which memory device(s) are used to contain the graphics memory may entail a simpler alternative algorithm in which the graphics memory is positioned at either the high or low end of a contiguous address space into which the memory device(s) are mapped. Such an alternative simpler algorithm may be deemed desirable if it is known that all of the memory devices (if there are multiple memory devices) and/or all of the banks of memory within each device are of substantially the same size and/or configuration such that there is no substantial advantage to locating part or all of the graphics memory in any one memory device and/or bank over any of the others.

Figure 11A:
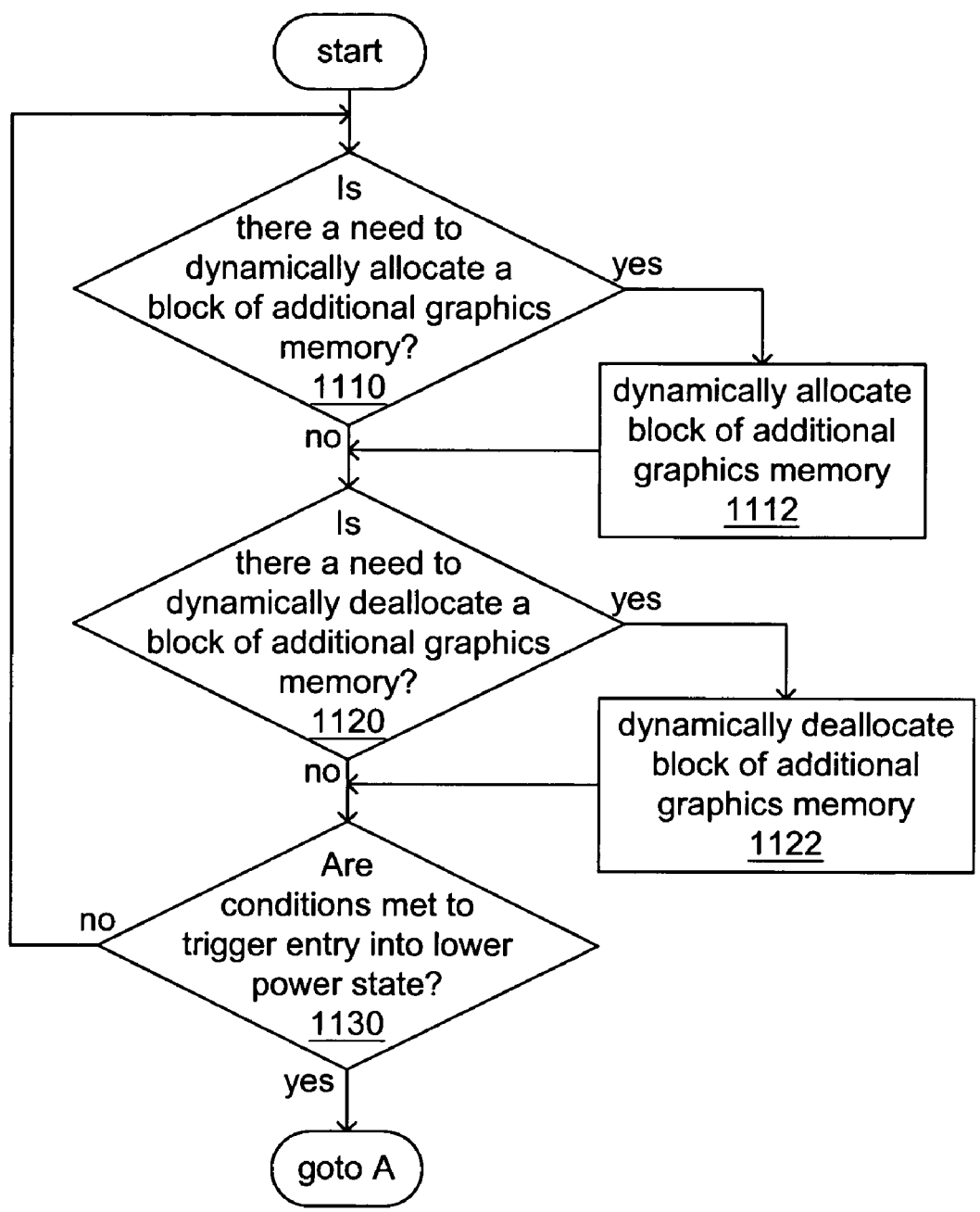
FIGS. 11a and 11b, together, are a flow chart of embodiments in which additional graphics memory is allocated and power states are controlled.
Figure 11B:
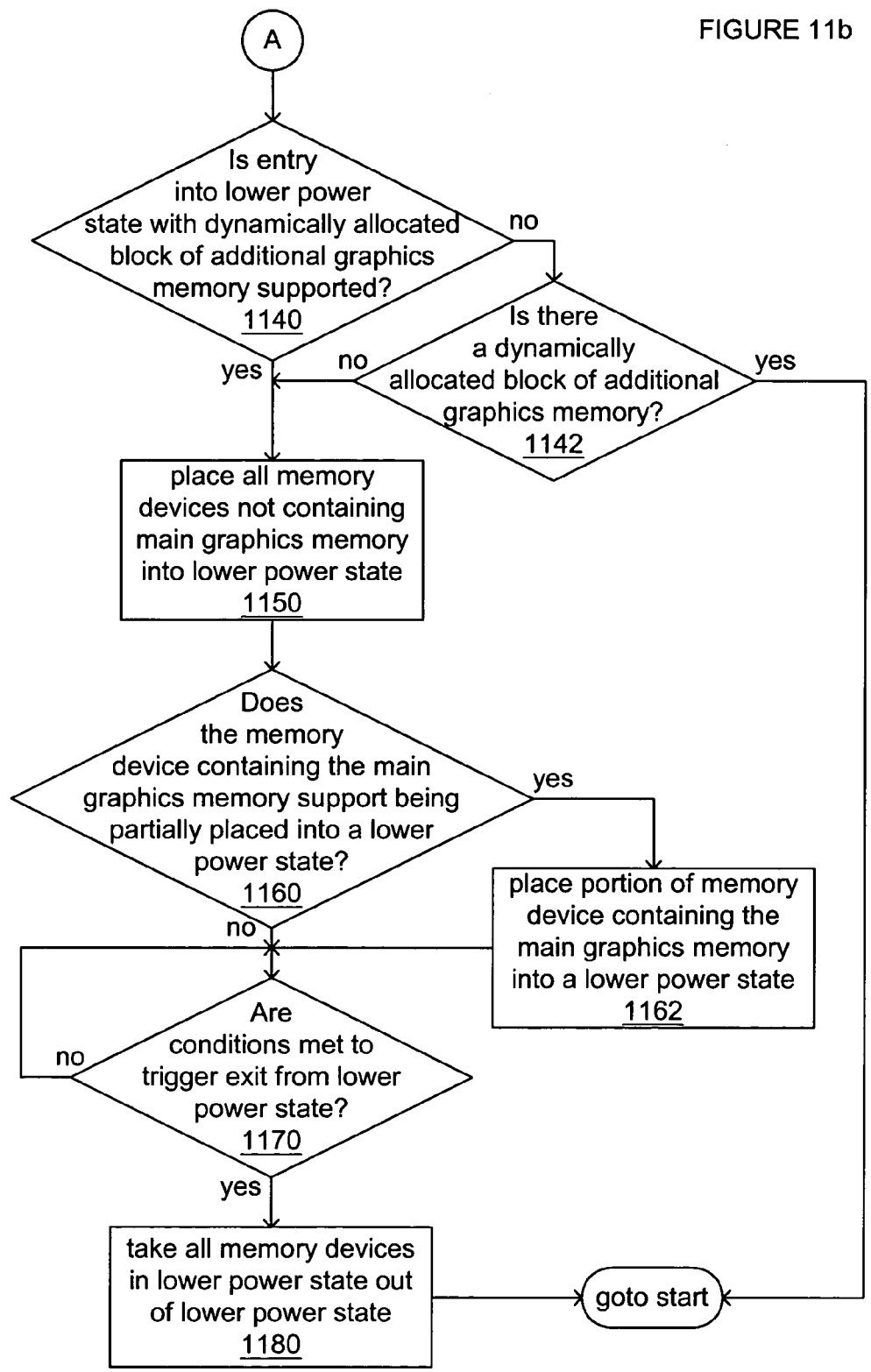

FIGS. 11*a* and 11*b*, together, are a flow chart of embodiments in which additional blocks of graphics memory may be dynamically allocated and/or memory devices may be selectively placed into a lower power state. Beginning with FIG. 11*a*, a determination is made at 1110 as to whether or not there is a need to dynamically allocate a block of additional graphics memory, and if so, an additional block of graphics memory is dynamically allocated at 1112. Regardless of whether an additional block of graphics memory needed to be dynamically allocated, a determination is made at 1120 as to whether or not there is a need to deallocate a previously dynamically allocated block of additional graphics memory, and if so, a dynamically allocated block of additional graphics memory is deallocated at 1122. Regardless of whether an dynamically allocated block of additional graphics memory needed to be deallocated, a determination is made at 1130 as to whether or not the conditions for triggering entry into a lower power state have been met, and if not, a determination as to whether or not there is a need to dynamically allocate a block of additional graphics memory is again made at 1110.

However, and referring now to FIG. 11*b*, if the conditions were met at 1130 to trigger entry into a lower power state, then a determination is made at 1140 as to whether or not entry into a lower power state (such that one or more memory devices may be placed into a lower power state) with one or more dynamically allocated additional blocks of graphics memory present is supported. If not, then a determination is made at 1142 as to whether or not such a dynamically allocated additional block of graphics memory is present, and if so, then a determination of a need for another of such blocks of graphics memory is again made at 1110. However, if either entry into a lower power state with such additional blocks of graphics memory is supported, or if entry into a lower power state with such additional blocks of graphics memory is not supported, but none are currently allocated, then at 1150, all memory devices not containing graphics memory that is not dynamically allocated (i.e., "main" graphics memory), if there are any, are placed into a lower power state. At 1160, a determination is made as to whether or not the memory device(s) that do contain at least a portion of the main graphics memory support being placed partially into a lower power state, e.g., whether or not those memory device(s) support having less than all of their banks of memory placed into a lower power state. If those memory devices do provide such support, then at 1162, the portion of those memory device(s) not containing the main graphics memory are placed into a lower power state, e.g., those banks of memory that do not contain at least a portion of the main graphics memory are placed into a lower power state while leaving banks that do contain at least a portion of the main graphics memory out of that lower power state such that they are still accessible for the retrieval (and display) of graphics data. Regardless of whether placing only a portion of such memory devices into a lower power state is supported, at 1170, a determination is made as to whether or not the conditions have been met to trigger exiting from a lower power state, and if not, then the conditions are retested at 1170. However, if conditions are met to trigger exiting from a lower power state, then at 1180, memory devices (and portions of memory devices) placed in a lower power state are taken out of the lower power state, and a determination as to the need to dynamically allocate an additional block of graphics memory is again made at 1110.

The invention has been described in conjunction with various possible embodiments. It is evident that numerous alternatives, modifications, variations and uses will be apparent to those skilled in the art in light of the foregoing description. It will be understood by those skilled in the art that the present invention may be practiced in support of various types of electronic systems with various possible memory devices in which the memory cells repeatedly require some form of "refreshing" or other regular maintenance activity in order to prevent the loss of data. Furthermore, it will be understood by those skilled in the art that although embodiments depicting multiple memory devices have depicted the use of a "backplane type" memory bus by which multiple memory devices and a memory controller are coupled together with a multitude of common signal lines, other embodiments employing a series of point-to-point memory buses are possible. It will also be understood by those skilled in the art that the present invention may be practiced in support of electronic systems other than computer systems such as audio/video entertainment devices, controller devices in vehicles, appliances controlled by electronic circuitry, etc.

What is claimed is:

1. A method comprising:
   determining a first quantity of memory required within a memory system to support a first block of a graphics memory to store graphics data;
   selecting an address location within the memory system at which to position the first block of the graphics memory that minimizes a number of banks of memory cells and a number of memory devices occupied by a portion of the first block of the graphics memory;

allocating the quantity of memory required within the memory system to support a first block of the graphics memory at the address location; and placing a first bank of memory cells within the memory system that is not occupied by any portion of the first block of the graphics memory into a lower power state in which the memory cells become inaccessible while refraining from placing a second bank of memory cells within the memory system, wherein the second bank is occupied by at least a portion of the first graphics memory, into a lower power state such that the memory cells remain accessible to read graphics data.

2. The method of claim 1, wherein the first and second banks of memory cells both exist within a first memory device, and placing the first bank of memory cells into a lower power state while refraining from placing the second bank of memory cells into a lower power state comprises signaling the first memory device to place the first bank into a lower power state while keeping the second bank out of a lower power state.

3. The method of claim 2, further comprising interrogating the first memory device to confirm that the first memory device supports placing one bank of memory cells within the first memory device into a lower power state while keeping another bank of memory cells within the first memory device out of a lower power state.

4. The method of claim 1, wherein the first bank of memory cells exists within a first memory device, the second bank of memory cells exists within a second memory device, and placing the first bank of memory cells into a lower power state while refraining from placing a second bank of memory cells into a lower power state comprises signaling the first memory device to place the first memory device into a lower power state while keeping at least the second bank out of a lower power state.

5. The method of claim 4, wherein the first and second memory devices are both coupled to a memory controller via a first memory bus, and placing the first memory device into a lower power state while keeping at least the second bank out of a lower power state comprises programming the memory controller to place the first memory device into a lower power state.

6. The method of claim 4, wherein the first memory device is coupled to a memory controller via a first memory bus, the second memory device is coupled to the memory controller via a second memory bus, and placing the first memory device into a lower power state while keeping at least the second bank out of a lower power state comprises placing the first memory bus into a lower power state.

7. The method of claim 1, further comprising:
repeatedly reading graphics data from the first block of the graphics memory to refresh an image on a display device while the first bank of memory cells is placed in a lower power state; and
taking the first bank of memory cells out of a lower power state.

8. The method of claim 7, further comprising:
receiving an indication of a need to dynamically allocate an additional block of the graphics memory to support an additional graphics function after completing execution of setup software through which the first block of the graphics memory was allocated;
dynamically allocating the additional block of the graphics memory;
receiving an indication that the dynamically allocated additional block of the graphics memory may be deallocated; and
deallocating the dynamically allocated additional block of the graphics memory.

9. The method of claim 8, further comprising:
placing a bank of memory cells occupied by at least a portion of the dynamically allocated additional block of the graphics memory into a lower power state if placing a portion of the memory system into a lower power state at a time when an dynamically allocated additional block of the graphics memory exists within the memory system is supported; and
refraining from placing a portion of the memory system into a lower power state if placing a portion of the memory system into a lower power state at a time when a dynamically allocated additional block of the graphics memory exists within the memory system is not supported and such a dynamically allocated additional block of the graphics memory does exist.

10. An apparatus comprising:
a processor;
a graphics controller; and
a first memory device having a first bank of memory cells to store a portion of a graphics memory and a second bank of memory cells to store a portion of a system memory, and supporting having the first bank being kept out of a lower power state, when the first bank stores the portion of the graphics memory, while the second bank is placed into a lower power states, wherein the second bank stores the portion of the system memory; and
a memory controller coupled to both the processor and the graphics controller, coupled to the first memory device via a first memory bus, to provide the graphics controller with access to the first bank regardless of whether the second bank is placed in to a lower power state, and to provide the processor with access to the second bank when the second bank is not placed into a lower power state.

11. The apparatus of claim 10 further comprising a second memory device to store another portion of a system memory, coupled to the memory controller via the first memory bus, and to be placed into a lower power state when the second bank is placed into a lower power state.

12. The apparatus of claim 10 further comprising:
a second memory bus coupled to the memory controller to be placed into a lower power state when the second bank is placed into a lower power state; and
a second memory device to store another portion of a system memory, coupled to the memory controller via the second memory bus, and to be placed into a lower power state when the second bank and second memory bus are placed into a lower power state.

13. A method comprising:
analyzing a size and quantity of banks of memory cells within a plurality of memory devices comprising a memory system;
selecting at least a first bank in which to contain at least a portion of a block of a graphics memory from within a memory device that supports placing a second bank into a lower power state while keeping bank having at least the portion of the graphics memory out of lower power state if such a memory device providing such support exists within the memory system; and
selecting at least one bank in which to contain at least a portion of a block of the graphics memory from within a memory device that does not support having one bank placed into a lower power state while another bank is kept out of a lower power state if a memory device providing such support does not exist within the memory system, and there exists another memory device in which no portion of the block of the graphics memory exists that may be independently placed into a lower power state.

14. A method, comprising: allocating a block of a graphics memory within a memory device of a memory system having a unified memory architecture (UMA) in a single contiguously addressable block positioned within the memory device so as to occupy as few banks of memory as possible if the memory device is large enough to contain all of the block of the graphics memory; and allocating a portion of the block of the graphics memory so as to fill an entire memory device in a single contiguously addressable block so as to occupy all of the banks of memory within the memory device if the memory device is not large enough to contain all of the block of the graphics memory, allocating the block of the graphics memory within the memory system so as to occupy as few memory devices as possible; and placing memory devices that are not occupied by any portion of the block of the graphics memory into a lower power state while refraining from placing one or more memory devices that are occupied by at least a portion of the block of the graphics memory into a lower power state.

15. A machine-accessible medium comprising code that when executed by a processor within an electronic system, causes the electronic system to perform operations, comprising:

determining a first quantity of memory required within a memory system to support a first block of a graphics memory to store graphics data;

selecting an address location within the memory system at which to position the first block of the graphics memory that minimizes a number of banks of memory cells and the number of memory devices occupied by a portion of the first block of the graphics memory;

allocating the quantity of memory required within the memory system to support a first block of the graphics memory at the address location; and placing a first bank of memory cells within the memory system that is not occupied by any portion of the first block of the graphics memory into a lower power state in which the memory cells become inaccessible, and refraining from placing a second bank of memory cells within the memory system, that wherein the second bank is occupied by at least a portion of the first block of the graphics memory, into a lower power state such that the memory cells remain accessible to read graphics data.

16. The machine-accessible medium of claim 15, further causing the processor to perform operations, comprising: taking the first bank of memory cells out of a lower power state;

receiving an indication of a need to dynamically allocate an additional block of the graphics memory to support an additional graphics function after completing allocation of the first block of the graphics memory;

dynamically allocating the additional block of the graphics memory; receiving an indication that the dynamically allocated additional block of the graphics memory may be deallocated; and deallocating the dynamically allocated additional block of the graphics memory.

* * * * *

UNITED STATES PATENT AND TRADEMARK OFFICE
CERTIFICATE OF CORRECTION

PATENT NO. : 7,081,897 B2 Page 1 of 1
APPLICATION NO. : 10/745824
DATED : July 25, 2006
INVENTOR(S) : Garg It is certified that error appears in the above-identified patent and that said Letters Patent is hereby corrected as shown below:

In column 24, line 59, between "keeping" and "bank" insert --the first--.

In column 24, line 60, between "of" and "lower" insert --the--.

In column 26, line 13, delete "that".

Signed and Sealed this

Fourteenth Day of November, 2006

JON W. DUDAS
*Director of the United States Patent and Trademark Office*